(12) United States Patent
Saitoh et al.

(10) Patent No.: US 11,912,195 B2
(45) Date of Patent: Feb. 27, 2024

(54) GETTING-OFF SUPPORT DEVICE

(71) Applicant: TOYOTA JIDOSHA KABUSHIKI KAISHA, Toyota (JP)

(72) Inventors: Noriyuki Saitoh, Nisshin (JP); Iwao Izumikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/828,250

(22) Filed: May 31, 2022

(65) Prior Publication Data

US 2022/0410799 A1    Dec. 29, 2022

(30) Foreign Application Priority Data

Jun. 29, 2021    (JP) ................................ 2021-107251

(51) Int. Cl.
| | |
|---|---|
| *B60Q 5/00* | (2006.01) |
| *B60R 21/013* | (2006.01) |
| *B60Q 3/70* | (2017.01) |
| *E05F 15/73* | (2015.01) |
| *B60Q 9/00* | (2006.01) |
| *E05F 15/72* | (2015.01) |
| *B60Q 3/80* | (2017.01) |

(52) U.S. Cl.
CPC ............... *B60Q 5/006* (2013.01); *B60Q 3/70* (2017.02); *B60Q 3/80* (2017.02); *B60Q 9/008* (2013.01); *B60R 21/013* (2013.01); *E05F 15/72* (2015.01); *E05F 15/73* (2015.01); *B60R 2021/01315* (2013.01)

(58) Field of Classification Search
None
See application file for complete search history.

(56) References Cited

U.S. PATENT DOCUMENTS

| | | | | |
|---|---|---|---|---|
| 7,192,172 | B1 * | 3/2007 | Alberti ................... | B60Q 1/323 |
| | | | | 362/543 |
| 9,511,730 | B1 * | 12/2016 | Wu ....................... | G06V 20/597 |
| 2006/0254142 | A1 * | 11/2006 | Das ....................... | B60R 21/013 |
| | | | | 49/26 |
| 2007/0188312 | A1 * | 8/2007 | Bihler .................... | B60Q 9/008 |
| | | | | 701/49 |
| 2009/0146799 | A1 * | 6/2009 | Goldstein ............... | B60Q 5/00 |
| | | | | 340/463 |
| 2010/0007736 | A1 * | 1/2010 | Mori ...................... | H04N 23/62 |
| | | | | 348/155 |

(Continued)

FOREIGN PATENT DOCUMENTS

| | | |
|---|---|---|
| CN | 206049585 U | 3/2017 |
| JP | 05-065631 U | 8/1993 |

(Continued)

*Primary Examiner* — Muhammad Adnan
(74) *Attorney, Agent, or Firm* — Sughrue Mion, PLLC

(57) ABSTRACT

A getting-off support device of a vehicle continues to issue an alarm for a predetermined time when a physical body condition indicating that a physical body that obstructs getting-off of an occupant in the vehicle exists around the vehicle and a getting-off condition indicating that the occupant in the vehicle intends to get off the vehicle are satisfied, and prolongs the time of issuing the alarm when both of the physical body condition and the getting-off condition are further satisfied while the issuing of the alarm is continued.

9 Claims, 11 Drawing Sheets

(56) References Cited

U.S. PATENT DOCUMENTS

| | | | |
|---|---|---|---|
| 2012/0053793 A1* | 3/2012 | Sala | B60N 2/0244 |
| | | | 701/45 |
| 2012/0065858 A1* | 3/2012 | Nickolaou | B60Q 9/008 |
| | | | 701/1 |
| 2012/0194356 A1* | 8/2012 | Haines | G08G 1/161 |
| | | | 340/933 |
| 2015/0170516 A1* | 6/2015 | Lee | B60Q 1/482 |
| | | | 340/988 |
| 2017/0144597 A1 | 5/2017 | Wu | |
| 2021/0209927 A1* | 7/2021 | Hedges | G08B 25/005 |
| 2022/0153228 A1* | 5/2022 | Nagano | B60R 25/20 |
| 2022/0154513 A1* | 5/2022 | Ishida | E05F 15/73 |
| 2022/0314982 A1* | 10/2022 | Matsumoto | B60W 50/14 |

FOREIGN PATENT DOCUMENTS

| | | |
|---|---|---|
| JP | 2012-076623 A | 4/2012 |
| JP | 2018-193031 A | 12/2018 |

\* cited by examiner

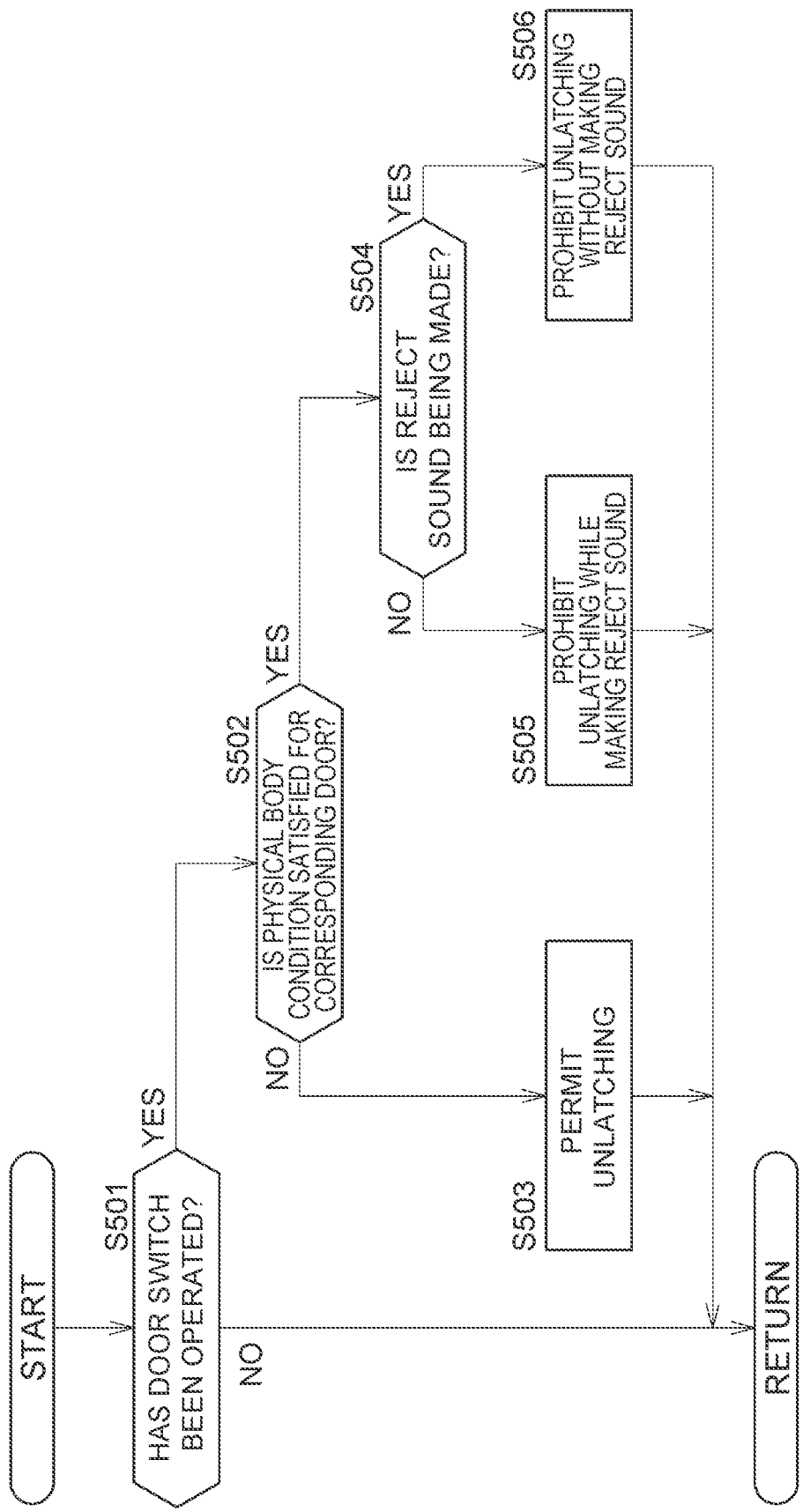

GETTING-OFF SUPPORT DEVICE

CROSS-REFERENCE TO RELATED APPLICATION

This application claims priority to Japanese Patent Application No. 2021-107251 filed on Jun. 29, 2021, incorporated herein by reference in its entirety.

BACKGROUND

1. Technical Field

The present disclosure relates to a getting-off support device.

2. Description of Related Art

Chinese Utility Model Application Publication No. 206049585 discloses a getting-off support device for a vehicle that includes a first sensor configured to detect that an occupant attempts to get off the vehicle, a second sensor configured to detect a traffic state such as the risk of collision, and warning means configured to issue an alarm signal depending on the traffic state detected by the second sensor. When the occupant attempts to get off the vehicle in a situation where the occupant can come in contact with another vehicle or the like, the getting-off support device described in Chinese Utility Model Application Publication No. 206049585 gives the alarm signal, and thereby can call the occupant's attention. Thus, the getting-off support device that gives warning for calling the occupant's attention in the case where another vehicle or the like comes close when the occupant gets off the vehicle is known.

In some cases, while the getting-off support device issues the alarm after detecting that an occupant attempts to get off the vehicle from a certain vehicle door, an occupant attempts to get off the vehicle from another vehicle door. In such cases, it is desirable to call attention also for the occupant that attempts to get off the vehicle from the other vehicle door. However, Chinese Utility Model Application Publication No. 206049585 does not disclose what alarm is issued in the case where an occupant attempts to get off the vehicle from a certain vehicle door and thereafter an occupant attempts to get off the vehicle from a different vehicle door (that is, what alarm is issued to the occupant that attempts to get off the vehicle from the different vehicle door).

SUMMARY

The present disclosure has been made in view of the above problem, and provides a getting-off support device that can provide appropriate alarms to occupants that satisfy a condition for issuing of the alarm when the condition for issuing of the alarm is satisfied multiple times.

For solving the above problem, the present disclosure includes:
  an alarm issuing unit (214, 215, 216, 217) provided in a vehicle (10) and configured to be capable of issuing an alarm; and
  an alarm issuing control unit (210) provided in the vehicle (10) and configured to control the issuing of the alarm by the alarm issuing unit (214, 215, 216, 217), in which:
  the alarm issuing control unit (210) determines whether a physical body condition is satisfied, the physical body condition indicating that a physical body that obstructs getting-off of an occupant in the vehicle exists around the vehicle (10);
  the alarm issuing control unit (210) determines whether a getting-off condition is satisfied, based on an open-close state of a door (102, 103, 104, 105) provided on the vehicle (10), the getting-off condition indicating that the occupant in the vehicle (10) intends to get off the vehicle (10);
  when both of the physical body condition and the getting-off condition are satisfied, the alarm issuing control unit (210) controls the alarm issuing unit (214, 215, 216, 217), such that the alarm issuing unit (214, 215, 216, 217) issues the alarm for a predetermined time; and
  when both of the physical body condition and the getting-off condition are further satisfied while the alarm issuing unit (214, 215, 216, 217) issues the alarm, the alarm issuing control unit (210) controls the alarm issuing unit (214, 215, 216, 217), such that a time during which the alarm issuing unit (214, 215, 216, 217) issues the alarm is prolonged relative to the predetermined time.

In this case, the present disclosure may be configured such that
  when both of the physical body condition and the getting-off condition are satisfied, the alarm issuing control unit (210) controls the alarm issuing unit (214, 215, 216, 217), such that the alarm issuing unit (214, 215, 216, 217) issues the alarm for a prescribed time that is a previously prescribed time, and
  when both of the physical body condition and the getting-off condition are further satisfied while the alarm issuing unit (214, 215, 216, 217) issues the alarm, the alarm issuing control unit (210) controls the alarm issuing unit (214, 215, 216, 217), such that the alarm issuing unit (214, 215, 216, 217) continues to issue the alarm until the prescribed time elapses after both of the physical body condition and the getting-off condition are further satisfied.

With the present disclosure, for example, while the alarm is issued because a certain occupant attempts to get off the vehicle and therefore both of the physical body condition and the getting-off condition are satisfied, both of the physical body condition and the getting-off condition are further satisfied because another occupant attempts to get off the vehicle. In this case, the continuation time of issuing the alarm is prolonged. Therefore, in the case where both of the physical body condition and the getting-off condition are satisfied multiple times because a plurality of occupant attempts to get off the vehicle at different timings, it is possible to call attention for each of the plurality of occupants.

The present disclosure includes:
  an alarm issuing unit (214, 215, 216, 217) provided in a vehicle (10) and configured to be capable of issuing an alarm; and
  an alarm issuing control unit (210) provided in the vehicle (10) and configured to control the issuing of the alarm by the alarm issuing unit (214, 215, 216, 217), in which:
  the alarm issuing control unit (210) determines whether a physical body condition is satisfied, the physical body condition indicating that a physical body that obstructs getting-off of an occupant in the vehicle exists around the vehicle (10);
  the alarm issuing control unit (210) determines whether a getting-off condition is satisfied, based on an open-close state of a door (102, 103, 104, 105) provided on the vehicle (10), the getting-off condition indicating that the occupant in the vehicle (10) intends to get off the vehicle (10);

when both of the physical body condition and the getting-off condition are satisfied, the alarm issuing control unit (210) controls the alarm issuing unit (214, 215, 216, 217), such that the alarm issuing unit (214, 215, 216, 217) repeatedly issues the alarm a predetermined number of times; and when both of the physical body condition and the getting-off condition are further satisfied while the alarm issuing unit (214, 215, 216, 217) issues the alarm, the alarm issuing control unit (210) controls the alarm issuing unit (214, 215, 216, 217), such that the number of times of issuing the alarm by the alarm issuing unit (214, 215, 216, 217) is increased.

In this case, the present disclosure may be configured such that when both of the physical body condition and the getting-off condition are satisfied, the alarm issuing control unit (210) controls the alarm issuing unit (214, 215, 216, 217), such that the alarm issuing unit (214, 215, 216, 217) repeatedly issues the alarm a prescribed number of times that is a previously prescribed number of times, and when both of the physical body condition and the getting-off condition are further satisfied while the alarm issuing unit (214, 215, 216, 217) issues the alarm, the alarm issuing control unit (210) controls the alarm issuing unit (214, 215, 216, 217), such that the alarm issuing unit (214, 215, 216, 217) repeatedly issues the alarm the prescribed number of times after both of the physical body condition and the getting-off condition are further satisfied.

With the present disclosure, for example, while the alarm is issued because a certain occupant attempts to get off the vehicle and therefore both of the physical body condition and the getting-off condition are satisfied, both of the physical body condition and the getting-off condition are further satisfied because another occupant attempts to get off the vehicle. In this case, the number of times of issuing the alarm is increased. Therefore, it is possible to exert the above-described effect.

The present disclosure includes:

an alarm issuing unit (214, 215, 216, 217) provided in a vehicle (10) and configured to be capable of issuing an alarm in a plurality of different manners; and an alarm issuing control unit (210) provided in the vehicle (10) and configured to control the issuing of the alarm by the alarm issuing unit (214, 215, 216, 217), in which:

the alarm issuing control unit (210) determines whether a physical body condition is satisfied, the physical body condition indicating that a physical body that obstructs getting-off of an occupant in the vehicle (10) exists around the vehicle (10);

the alarm issuing control unit (210) determines whether a getting-off condition is satisfied, based on an open-close state of a door (102, 103, 104, 105) provided on the vehicle (10), the getting-off condition indicating that the occupant in the vehicle (10) intends to get off the vehicle (10);

when both of the physical body condition and the getting-off condition are satisfied, the alarm issuing control unit (210) controls the alarm issuing unit (214, 215, 216, 217), such that the alarm issuing unit (214, 215, 216, 217) issues the alarm in a predetermined manner; and when both of the physical body condition and the getting-off condition are further satisfied while the alarm issuing unit (214, 215, 216, 217) issues the alarm in the predetermined manner, the alarm issuing control unit (210) controls the alarm issuing unit (214, 215, 216, 217), such that the alarm issuing unit (214, 215, 216, 217) issues the alarm in a different manner from the predetermined manner.

With the present disclosure, for example, while the alarm is issued because a certain occupant attempts to get off the vehicle and therefore both of the physical body condition and the getting-off condition are satisfied, both of the physical body condition and the getting-off condition are further satisfied because another occupant attempts to get off the vehicle. In this case, the manner of the alarm that is issued due to the first satisfaction of the physical body condition and the getting-off condition and the manner of the alarm that is issued due to the second and subsequent satisfactions of the physical body condition and the getting-off condition are different from each other. Therefore, it is possible to exert the above-described effect.

The present disclosure includes:

a plurality of alarm issuing units (214, 215, 216, 217) provided in a vehicle (10) and configured to be capable of issuing an alarm in a plurality of different manners; and an alarm issuing control unit (210) provided in the vehicle (10) and configured to control the issuing of the alarm by the plurality of alarm issuing units (214, 215, 216, 217), in which:

the alarm issuing control unit (210) determines whether a physical body condition is satisfied, the physical body condition indicating that a physical body that obstructs getting-off of an occupant in the vehicle exists around the vehicle (10);

the alarm issuing control unit (210) determines whether a getting-off condition is satisfied, based on an open-close state of a door (102, 103, 104, 105) provided on the vehicle (10), the getting-off condition indicating that the occupant in the vehicle (10) intends to get off the vehicle (10);

when both of the physical body condition and the getting-off condition are satisfied, the alarm issuing control unit (210) controls at least one of the plurality of alarm issuing units (214, 215, 216, 217), such that the at least one of the plurality of alarm issuing units (214, 215, 216, 217) issues the alarm; and when both of the physical body condition and the getting-off condition are further satisfied while the at least one of the plurality of alarm issuing units (214, 215, 216, 217) issues the alarm, the alarm issuing control unit (210) controls at least another one of the plurality of alarm issuing units (214, 215, 216, 217), such that the at least another one of the plurality of alarm issuing units (214, 215, 216, 217) issues the alarm.

With the present disclosure, for example, while the alarm is issued because a certain occupant attempts to get off the vehicle and therefore both of the physical body condition and the getting-off condition are satisfied, both of the physical body condition and the getting-off condition are further satisfied because another occupant attempts to get off the vehicle. In this case, the alarm issuing unit that issues the alarm due to the first satisfaction of the physical body condition and the getting-off condition and the alarm issuing unit that issues the alarm due to the second and subsequent satisfactions of the physical body condition and the getting-off condition are different from each other.

Therefore, it is possible to exert the above-described effect.

The present disclosure includes:

a door locking device (241, 242, 243, 244) configured to be capable of switching a door (102, 103, 104, 105) provided on a vehicle (10) from an unopenable state to an openable state by drive force of a drive force source;

an operation unit (245, 246, 247, 248) configured to be operated by an occupant such that the door locking device (241, 242, 243, 244) switches the door (102, 103, 104, 105) from the unopenable state to the openable state;

a sound issuing unit (217) configured to be capable of issuing a predetermined sound; and a control unit (209, 210) configured to control the door locking device (241, 242, 243, 244) such that the door locking device (241, 242, 243, 244) switches the door (102, 103, 104, 105) from the unopenable state to the openable state, and to control the issuing of the predetermined sound by the sound issuing unit (217), in which:

the control unit (210) determines whether a physical body condition is satisfied, the physical body condition indicating that a physical body that obstructs getting-off of an occupant in the vehicle exists around the vehicle (10);

when the operation unit (245, 246, 247, 248) is operated in a case where the physical body condition is satisfied and where the sound issuing unit (217) does not issue the predetermined sound, the control unit (210) controls the door locking device (241, 242, 243, 244) such that the door locking device (241, 242, 243, 244) does not switch the door (102, 103, 104, 105) from the unopenable state to the openable state, and controls the sound issuing unit (217) such that the sound issuing unit (217) issues the predetermined sound indicating that the door (102, 103, 104, 105) has not been switched to the openable state by the operation to the operation unit (245, 246, 247, 248); and when the operation unit (245, 246, 247, 248) is operated in a case where the physical body condition is satisfied and where the sound issuing unit (217) issues the predetermined sound, the control unit (210) controls the door locking device (241, 242, 243, 244) such that the door locking device (241, 242, 243, 244) does not switch the door (102, 103, 104, 105) from the unopenable state to the openable state, and controls the sound issuing unit (217) such that the sound issuing unit (217) does not issue the predetermined sound by the operation to the operation unit (245, 246, 247, 248) during the issuing of the predetermined sound by the sound issuing unit (217).

When "the predetermined sounds indicating that the door locking device has not switched the door to the openable state" are superimposed with each other, there is a concern that the occupant may recognize the superimposed sounds as a different sound from "the predetermined sound indicating that the door locking device has not switched the door to the openable state". With the present disclosure, in the case where the operation to the operation unit is repeated, it is possible to avoid the superimposition of "the predetermined sounds indicating that the door locking device has not switched the door to the openable state". Therefore, it is possible to prevent the above false recognition.

In the above description, for facilitating understanding of the present disclosure, terms and/or reference numerals used in later-described embodiments are added to constituents in the present disclosure corresponding to the embodiments, in parentheses. However, each constituent element in the present disclosure is not limited to the embodiments prescribed by the terms and/or reference numerals.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 11 is a flowchart showing a getting-off support routine.

DETAILED DESCRIPTION OF EMBODIMENTS

First Embodiment

Configurations of Vehicle and Getting-Off Support Device

Figure 1:
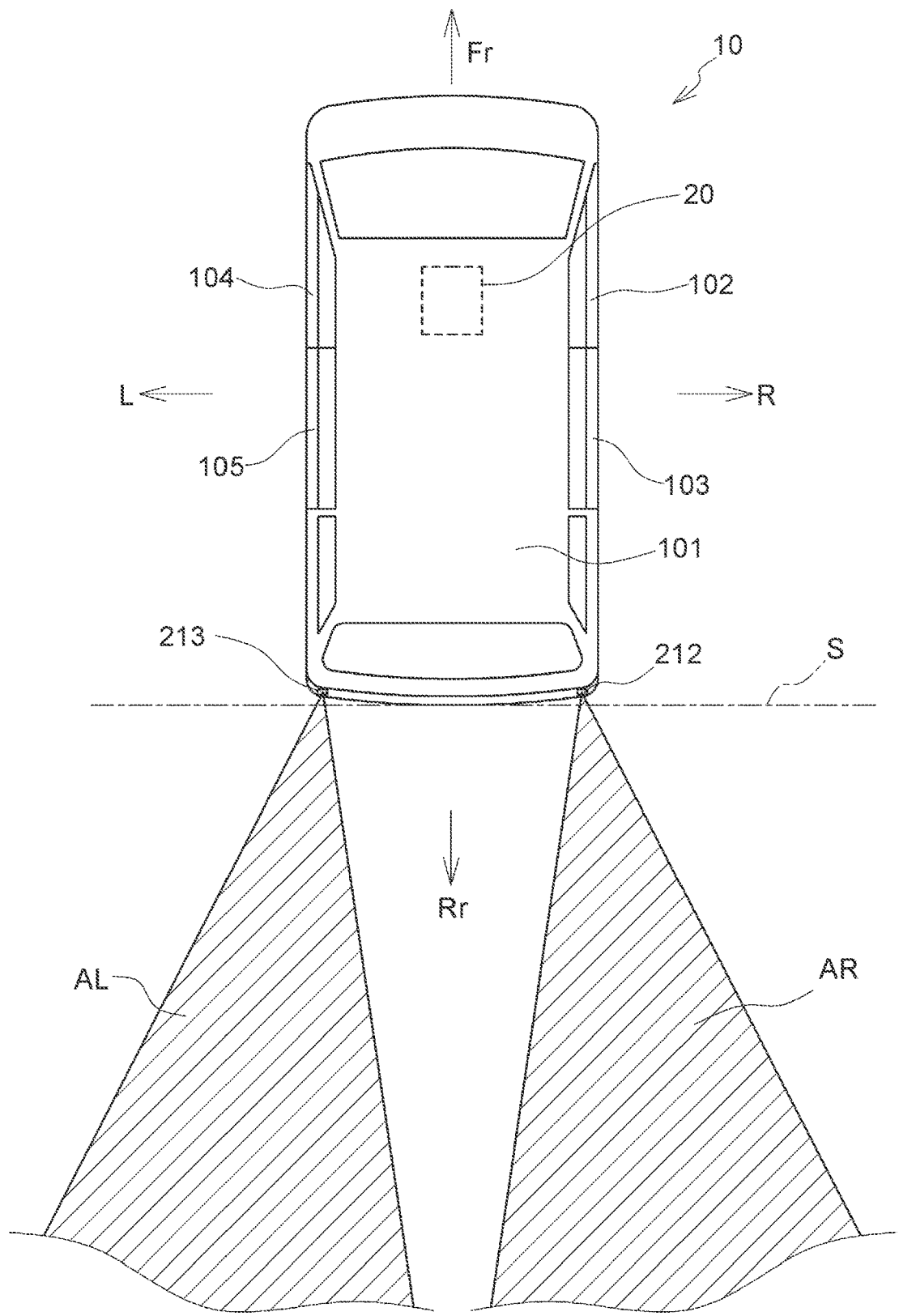
FIG. 1 is a schematic view showing a vehicle.

FIG. 1 is a schematic diagram showing a vehicle 10. In FIG. 1, a front side of the vehicle 10 is shown by an arrow Fr, a rear side of the vehicle 10 is shown by an arrow Rr, a right side of the vehicle 10 is shown by an arrow R, and a left side of the vehicle 10 is shown by an arrow L. As shown in FIG. 1, the vehicle 10 is equipped with a getting-off support device 20 according to an embodiment of the present disclosure, and includes a right front door 102 provided on a right front side of a vehicle body 101, a right rear door 103 provided on a right rear side of the vehicle body 101, a left front door 104 provided on a left front side of the vehicle body 101, and a left rear door 105 provided on a left rear side of the vehicle body 101, as doors through which an occupant gets in or off. In the following description, the right front door 102 and right rear door 103 provided on the right side of the vehicle 10 are sometimes collectively referred to as "right doors 102, 103", and the left front door 104 and left rear door 105 provided on the left side of the vehicle 10 are sometimes collectively referred to as "left doors 104, 105".

Figure 2:
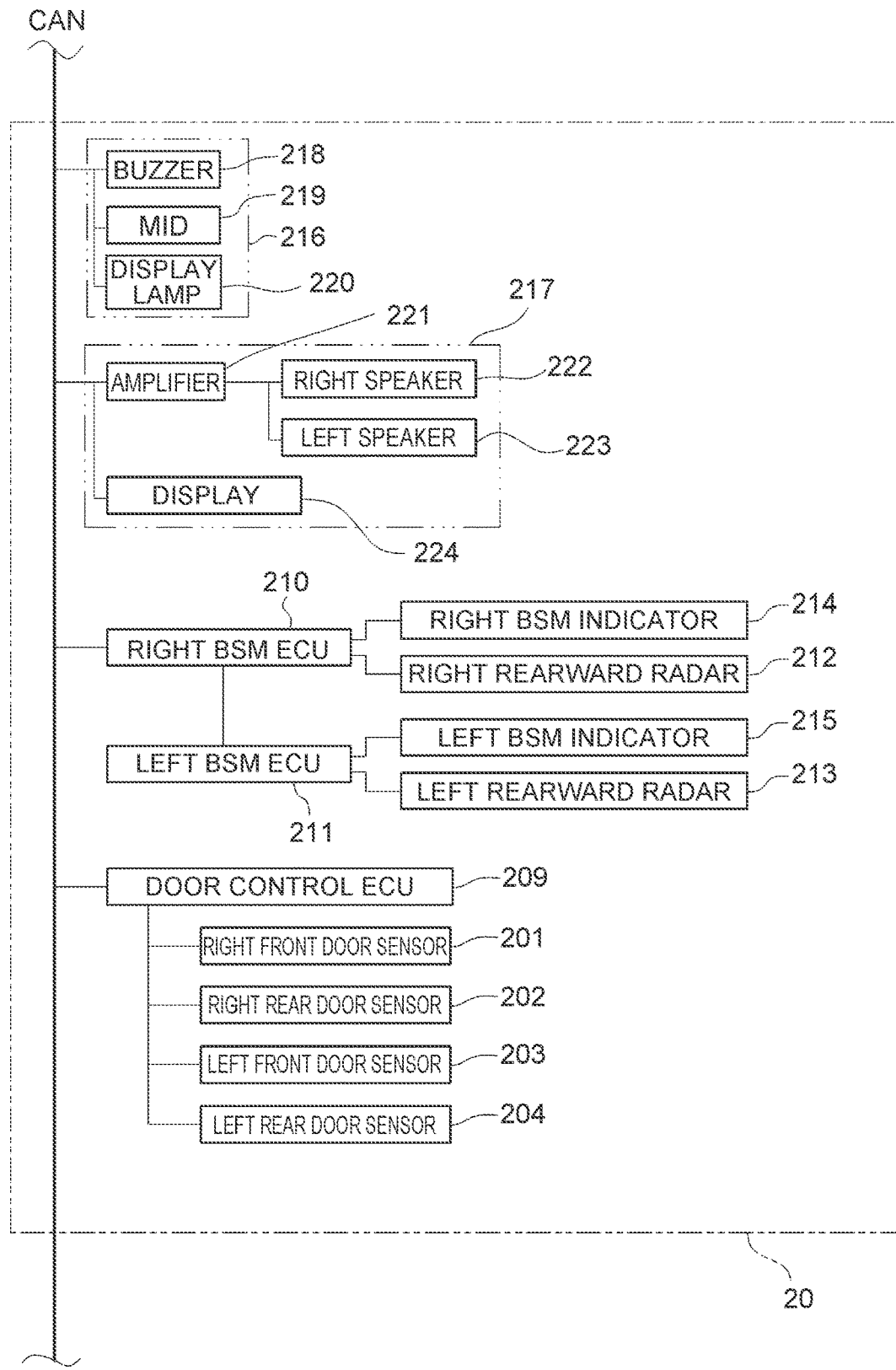
FIG. 2 is a diagram showing a configuration of a getting-off support device.

The getting-off support device 20 is equipped in the vehicle 10. FIG. 2 is a diagram showing a configuration of the getting-off support device 20. As shown in FIG. 2, the getting-off support device 20 includes a right front door sensor 201, a right rear door sensor 202, a left front door sensor 203, a left rear door sensor 204, a door control ECU 209, a right BSM ECU 210, a left BSM ECU 211, a right rearward radar 212, a left rearward radar 213, a right BSM indicator 214, a left BSM indicator 215, a meter device 216, and a multimedia device 217.

The door control ECU 209, the right BSM ECU 210, the meter device 216 and the multimedia device 217 are connected so as to be capable of sending and receiving signals through a CAN. Further, the right BSM ECU 210 and the left BSM ECU 211 are connected so as to be capable of sending and receiving signals through a local bus. Each ECU is an electronic control device that includes a microcomputer as a major part. The microcomputer includes a CPU, a ROM, a RAM, a non-volatile memory, an interface I/F and the like. The CPU is configured to realize various functions by reading instructions (programs, routines) stored in the ROM and expanding and executing on the RAM. BSM is an abbreviation for "blind spot monitor", ECU is an abbreviation for "electronic control unit", and CAN is an abbreviation for "controller area network".

The right front door sensor 201 is configured to be capable of detecting an open-close state of the right front door 102 (whether the right front door 102 is in an open state or in a close state). The right rear door sensor 202 is configured to be capable of detecting an open-close state of the right rear door 103. The left front door sensor 203 is configured to be capable of detecting an open-close state of the left front door 104. The left rear door sensor 204 is configured to be capable of detecting an open-close state of the left rear door 105. In the embodiment, the open state of each of the doors 102, 103, 104, 105 is a state where each of the doors 102, 103, 104, 105 does not cover an opening portion (an entrance through which the occupant gets in or off) provided on the vehicle body 101 and where each of the doors 102, 103, 104, 105 is allowed to move relative to the vehicle body 101. The close state is a state where each of the doors 102, 103, 104, 105 covers the opening portion provided on the vehicle body 101 and where each of the doors 102, 103, 104, 105 is not allowed to move relative to the vehicle body 101. Each of the door sensors 201, 202, 203, 204 generates an open signal indicating that the door as the detection object for the open-close state is in the open state, during a period when each of the door sensors 201, 202, 203, 204 detects that the door is in the open state, and generates a close signal indicating that the door as the detection object for the open-close state is in the close state, during which a period when each of the door sensors 201, 202, 203, 204 detects that the door is in the close state. The door sensors 201, 202, 203, 204 are connected to the door control ECU 209. The door control ECU 209 acquires detection results about the open-close states of the doors 102, 103, 104, 105 by the door sensors 201, 202, 203, 204. The right BSM ECU 210 can acquire the detection results about the open-close states of the doors 102, 103, 104, 105 by the door sensors 201, 202, 203, 204, through the door control ECU 209.

The right BSM ECU 210 and the left BSM ECU 211 are control devices that are hubs for getting-off support, and are configured to be capable of executing a later-described getting-off support control. The right BSM ECU 210 and the left BSM ECU 211 are connected so as to be capable of mutually sending and receiving signals by a master-slave system. In the embodiment, the right BSM ECU 210 is a master, and the left BSM ECU 211 is a slave. The right BSM ECU 210 that is a master is connected to the CAN.

The right rearward radar 212 is fixed to a right rear corner portion of the vehicle body 101 (for example, a member provided on the back side of a rear bumper). The right rearward radar 212 emits an electric wave toward a predetermined region (referred to as a "right detection area AR" hereinafter) on a right rearward side of the vehicle 10 shown in FIG. 1, and receives a reflected wave of the emitted electric wave. The left rearward radar 213 is fixed to a left rear corner portion of the vehicle body 101. The left rearward radar 213 emits an electric wave toward a predetermined region (referred to as a "left detection area AL" hereinafter) on a left rearward side of the vehicle 10 shown in FIG. 1, and receives a reflected wave of the emitted electric wave. The right rearward radar 212 and the left rearward radar 213 detect and acquire information including positions (relative distances and relative directions to the right rearward radar 212 and the left rearward radar 213) of physical bodies that exist in the right detection area AR and the left detection area AL respectively, relative speeds, sizes (widths) of the physical bodies, and the like. Hereinafter, the information is referred to as "physical target information". That is, the right rearward radar 212 can acquire the physical target information about the physical body that exists in the right detection area AR, and the left rearward radar 213 can acquire the physical target information about the physical body that exists in the left detection area AL. The physical target information may be information that directly indicates the relative position of the physical body to the right rearward radar 212 or the left rearward radar 213, the relative speed, the size of the physical target, and the like, or may be information from which the relative position, the relative speed, the size of the physical target, and the like can be calculated by computation.

The right rearward radar 212 is connected to the right BSM ECU 210, and sends the acquired physical target information about the physical body that exists in the right detection area AR, to the right BSM ECU 210. The left rearward radar 213 is connected to the left BSM ECU 211, and sends the acquired physical target information about the physical body that exists in the left detection area AL, to the left BSM ECU 211. Furthermore, through the left BSM ECU 211, the right BSM ECU 210 acquires the physical target information about the physical body that exists in the left detection area AL, which is the physical target information acquired by the left rearward radar 213.

Specific ranges of the right detection area AR and the left detection area AL are not particularly limited. The right detection area AR only needs to include a region in which it is possible to detect the physical body that comes close to the vehicle 10 from the right rearward side of the vehicle 10 (particularly, the physical body that comes close to the right side of the vehicle 10), and the left detection area AL only needs to include a region in which it is possible to detect the physical body that comes close to the vehicle 10 from the left rearward side of the vehicle 10 (particularly, the physical body that comes close to the left side of the vehicle 10). Further, the right detection area AR includes a blind region (right-side blind region) that is not reflected by a right side mirror (in other words, a blind region that cannot be seen by a driver sitting at a driver's seat), and the left detection area AL includes a blind region (left-side blind region) that is not reflected by a left side mirror.

Each of the right BSM indicator 214 and the left BSM indicator 215 includes a light source (for example, an LED), and is configured to be capable of issuing an alarm (in other words, capable of calling attention for the occupant of the vehicle 10) by light emission (lighting and blinking). The right BSM indicator 214 is built in the right side mirror, and the left BSM indicator 215 is built in the left side mirror. The right BSM indicator 214 is connected to the right BSM ECU 210, and performs lighting and blinking based on a lighting command and blinking command that are sent from the right BSM ECU 210. The left BSM indicator 215 is connected to the left BSM ECU 211, and performs lighting and blinking based on a lighting command and blinking command that are sent from the left BSM ECU 211. The right BSM indicator 214 and the left BSM indicator 215 do not always need to be provided in the side mirrors, and may be provided on vehicle cabin inner sides of A-pillars, for example.

The meter device 216 is installed forward of the driver's seat in the vehicle cabin of the vehicle 10 (for example, in an instrument panel), and includes various meters (for example, a speed meter). The meter device 216 is configured to be capable of issuing an alarm to the occupant of the vehicle 10 using at least one of a sound, a light and an image. Specifically, the meter device 216 includes a buzzer 218 that can sound, a MID 219 (multi-information display) that can display the image, and a display lamp 220 that can emit the light. The right BSM ECU 210 can cause the buzzer 218 to sound by sending a buzzer sounding command to the meter device 216 through the CAN, can cause the MID 219 to display a predetermined image by sending a screen display command, and can cause the display lamp 220 to perform lighting and blinking by sending a lighting command and a blinking command.

On the other hand, the left BSM ECU 211 is configured to be capable of causing the buzzer 218 of the meter device 216 to sound through the right BSM ECU 210, by sending a buzzer sounding command to the right BSM ECU 210. The left BSM ECU 211 is configured to be capable of causing the MID 219 of the meter device 216 to display a predetermined image through the right BSM ECU 210, by sending a screen display command to the right BSM ECU 210. Furthermore, the left BSM ECU 211 is configured to be capable of causing the display lamp 220 of the meter device 216 to perform lighting and blinking through the right BSM ECU 210, by sending a lighting command and blinking command to the right BSM ECU 210.

The multimedia device 217 is disposed in the vehicle cabin of the vehicle 10. The multimedia device 217 includes an amplification device (amplifier 221), a right speaker 222 and a left speaker 223, and is configured to be capable of speaking a voice message. The right speaker 222 is provided at a position (for example, the right door 102 or 103) around the right side in the vehicle, and the left speaker 223 is provided at a position (for example, the left door 104 or 105) around the left side in the vehicle. Furthermore, the multimedia device 217 includes a display 224, and is configured to be capable of displaying various images. The display 224 can be used also as a display for navigation, and is arranged in a center cluster, for example. The right BSM ECU 210 can cause the right speaker 222 and left speaker 223 of the multimedia device 217 to speak a predetermined voice message, by sending a speech command to the multimedia device 217 through the CAN, and can cause the display 224 of the multimedia device 217 to display a predetermined image, by sending an image display command. The left BSM ECU 211 can cause the right speaker 222 and left speaker 223 of the multimedia device 217 to speak a predetermined voice message, by sending a speech command to the right BSM ECU 210, and can cause the display 224 of the multimedia device 217 to display a predetermined image, by sending an image display command to the right BSM ECU 210.

Getting-Off Support Control

Next, a getting-off support control that is executed by the getting-off support device 20 will be described. With a predetermined period, the getting-off support device 20 repeatedly determines whether a predetermined condition indicating "a physical body (referred to as a "caution physical body" hereinafter) that obstructs getting-off of the occupant in the vehicle 10 exists around the vehicle 10" is satisfied, for each of the right side and left side of the vehicle 10 (vehicle body 101). Hereinafter, this condition is referred to as a "physical body condition". It can be said that the physical body condition is a "condition indicating that it is necessary to call attention to the physical body that exists around the vehicle 10, for the occupant in the vehicle 10". Furthermore, with a predetermined period, the getting-off support device 20 repeatedly determines whether a predetermined condition indicating it can be regarded that "the occupant intends to get off the vehicle 10" from the doors 102, 103, 104, 105 is satisfied, for each of the doors 102, 103, 104, 105. Hereinafter, this condition is referred to as a "getting-off condition". The getting-off support device 20 issues a later-described primary alarm when the physical body condition is satisfied, and issues a later-described secondary alarm when both of the physical body condition and the getting-off condition are satisfied.

Physical Body Condition

The physical body condition and a determination method for the physical body condition will be described. When the right rearward radar 212 detects a physical body that exists in the right detection area AR, the right BSM ECU 210 calculates a time until the physical body arrives at a determination criterion position S that is previously set for the vehicle 10, based on the physical target information (specifically, the distance from the vehicle 10 to the physical body, the speed of the physical body, and the like) acquired from the right rearward radar 212. In the embodiment, as shown in FIG. 1, a line S that passes through a rear end portion of the vehicle 10, that is parallel to a vehicle-width direction (right-left direction), and that is within a predetermined distance (for example, 3 m) from a vehicle-width-directional end portion of the vehicle 10 is used as the determination criterion position S. The determination criterion position S may be a position within a predetermined distance from the center of the rear end portion of the vehicle 10. The right BSM ECU 210 calculates a time until at least a part (for example, a front end portion) of the detected physical body reaches the determination criterion position S, as "the time until the physical body arrives at the determination criterion position S". Similarly, when the left rearward radar 213 detects a physical body that exists in the left detection area AL, the left BSM ECU 211 calculates a time until the physical body arrives at the determination criterion position S that is previously set for the vehicle 10, based on the physical target information acquired from the left rearward radar 213. The left BSM ECU 211 calculates a time until at least a part (for example, a front end portion) of the detected physical body reaches the determination criterion position S, as "the time until the physical body arrives at the determination criterion position S", and sends the calculation result to the right BSM ECU 210.

The right BSM ECU 210 determines whether the time until the physical body detected by the right rearward radar 212 arrives at the determination criterion position S is equal to or shorter than a predetermined threshold. In the case where the time is equal to or shorter than the predetermined threshold, the right BSM ECU 210 determines that the caution physical body exists on the right side of the vehicle 10. That is, the right BSM ECU 210 determines that the physical body condition is satisfied for the right side of the vehicle 10. Similarly, the right BSM ECU 210 determines whether "the time until the physical body arrives at the determination criterion position S" calculated by the left BSM ECU 211 (that is, the time until the physical body detected by the left rearward radar 213 arrives at the determination criterion position S) is equal to or shorter than the predetermined threshold. In the case where the time is equal to or shorter than the predetermined threshold, the right BSM ECU 210 determines that the physical body condition is satisfied for the left side of the vehicle 10. With the predetermined period, the right BSM ECU 210 repeatedly executes the determination of whether the physical body condition is satisfied (the determination of whether the caution physical body exists), for each of the right side and left side of the vehicle 10. "The physical body condition is satisfied for the right side of the vehicle 10" means "the physical body condition is satisfied for the right doors 102, 103 of the vehicle 10". Similarly, "the physical body condition is satisfied for the left side of the vehicle 10" means "the physical body condition is satisfied for the left doors 104, 105 of the vehicle 10".

Getting-Off Condition

Next, the getting-off condition and a determination method for the getting-off condition will be described. The getting-off condition is a "condition indicating that it can be regarded that the occupant intends to get off the vehicle". In the embodiment, the right BSM ECU 210 determines whether the open-close state of each of the doors 102, 103, 104, 105 is the open state or the close state, based on the detection result about the open-close state of each of the doors 102, 103, 104, 105 by each of the door sensors 201, 202, 203, 204, which is the detection result acquired from the door control ECU 209. For example, in the case where the right BSM ECU 210 determines that the right front door 102 is in the open state, the right BSM ECU 210 determines that the getting-off condition is satisfied for the right front door 102, and in the case where the right BSM ECU 210 determines that the right front door 102 is in the close state, the right BSM ECU 210 determines that the getting-off condition is not satisfied for the right front door 102. The right BSM ECU 210 determines whether the getting-off condition is satisfied, for the other doors, in a similar way.

Primary Alarm and Secondary Alarm

The primary alarm is an alarm for informing (calling attention) the occupant that there is a physical body (caution physical body) that comes close to the vehicle 10 from the rearward side of the vehicle 10. The getting-off support device 20 issues the primary alarm, while it is determined that the physical body condition is satisfied but the getting-off condition is not satisfied. The secondary alarm is an alarm for informing an occupant that attempts to get off the vehicle 10 from a certain door, that there is a physical body (caution physical body) that comes close to the side of the vehicle on which the certain door is provided. The getting-off support device 20 starts to issue the secondary alarm, when it is determined that both of the physical body condition and the getting-off condition are satisfied. For explanatory convenience, the physical body condition and the getting-off condition are referred to as "both conditions", hereinafter. "Both conditions are satisfied" means "both of the physical body condition and the getting-off conditions are satisfied". When it is determined that the getting-off condition is satisfied (that is, it is determined that both conditions are satisfied) while the getting-off support device 20 issues the primary alarm (that is, while it is determined that the physical body condition is satisfied), the getting-off support device 20 stops issuing the primary alarm, and starts to issue the secondary alarm. That is, in this case, the getting-off support device 20 switches the alarm to be issued, from the primary alarm to the secondary alarm.

Then, the getting-off support device 20 continues to issue the secondary alarm for a predetermined time from the time point when the both conditions are satisfied, and stops issuing the secondary alarm when the predetermined time elapses from the time point when both conditions are satisfied. The continuation time (the "predetermined time") of issuing the secondary alarm is previously set. Hereinafter, the "previously set time" is referred to as a "prescribed time P". However, as described later, when a predetermined prolongation condition is satisfied for the device that issues the secondary alarm, the continuation time of issuing the secondary alarm by the device is prolonged (that is, the continuation time of issuing the secondary alarm becomes longer than the "prescribed time P"). In the case where it is determined that the physical body condition is satisfied but the getting-off condition is not satisfied during the continuation of issuing the secondary alarm at a time point before the prescribed time P elapses, the getting-off support device 20 continues to issue the secondary alarm until a predetermined time elapses from the time point of the determination. When the predetermined time elapses, the getting-off support device 20 stops issuing the secondary alarm and starts to issue the primary alarm. In the case where it is determined that the physical body condition is not satisfied while the getting-off support device 20 issues the primary alarm, the getting-off support device 20 stops issuing the primary alarm. In the case where it is determined that neither the physical body condition nor the getting-off condition is satisfied at a time point before the prescribed time P elapses while the getting-off support device 20 issues the secondary alarm, the getting-off support device 20 continues to issue the secondary alarm until a predetermined time elapses from the time point of the determination.

When the predetermined time elapses, the getting-off support device 20 stops issuing the secondary alarm, and does not issue the primary alarm. In the case where the getting-off support device 20 detects, for example, an operation to turn off the behavior of the getting-off support device 20 while the getting-off support device 20 issues the secondary alarm, the getting-off support device 20 immediately stops issuing the secondary alarm. A specific length of the "predetermined time" is not particularly limited, and is appropriately set.

Primary Alarm

Examples of the primary alarm will be described. A single or a plurality of examples of the following examples is applied as the primary alarm.

Lighting of the right BSM indicator 214 and/or the left BSM indicator 215

Lighting of the display lamp 220 of the meter device 216

Displaying of a predetermined attention call image by the MID 219 of the meter device 216

Displaying of a predetermined attention call image by the display 224 of the multimedia device 217

In the embodiments of the present disclosure, "lighting" means an action of maintaining a state of light emission, and "blinking" means an action of repeating light emission and light non-emission.

The right BSM ECU 210 sends a primary alarm issue command to a device that issues the primary alarm (or another device that controls the device that issues the primary alarm), and thereby can cause the device to issue the primary alarm while issuing the primary alarm issue command. That is, the right BSM ECU 210 controls a device that issues the primary alarm (or another device that controls the device that issues the primary alarm), and thereby can cause the device to issue the primary alarm. Specifically, in the case where the primary alarm is "lighting of the right BSM indicator 214", the right BSM ECU 210 sends the lighting command to the right BSM indicator 214 as the primary alarm issue command, and thereby cause the right BSM indicator 214 to perform lighting. In the case where the primary alarm is "lighting of the left BSM indicator 215", the right BSM ECU 210 sends the lighting command to the left BSM ECU 211 as the primary alarm issue command. When the left BSM ECU 211 receives the primary alarm issue command from the right BSM ECU 210, the left BSM ECU 211 sends the lighting command to the left BSM indicator 215, and causes the left BSM indicator 215 to perform lighting.

In the case where the primary alarm is "lighting of the display lamp 220 of the meter device 216", the right BSM ECU 210 sends the lighting command to the meter device 216 as the primary alarm issue command, and thereby causes the display lamp 220 of the meter device 216 to perform lighting. In the case where the primary alarm is "displaying of a predetermined attention call image by the MID 219 of the meter device 216", the right BSM ECU 210 sends the image display command to the meter device 216 as the primary alarm issue command, and thereby causes the MID 219 to display the predetermined attention call image. In the case where the primary alarm is "displaying of a predetermined attention call image by the display 224 of the multimedia device 217", the right BSM ECU 210 sends the image display command to the multimedia device 217 as the primary alarm issue command, and thereby causes the display 224 of the multimedia device 217 to display the predetermined attention call image.

By such actions, while the physical body condition is satisfied for at least one of the right side and left side of the vehicle 10, the meter device 216 continues to issue the primary alarm. Thereby, it is possible to inform the occupant that the caution physical body exists.

Secondary Alarm

Next, examples of the secondary alarm will be described. The secondary alarm is an alarm that has a different content from the primary alarm. Furthermore, the secondary alarm is an alarm that has a higher level of attention call for the occupant than the primary alarm. A single or a plurality of examples of the following examples is applied as the secondary alarm.

Blinking of the right BSM indicator 214 and/or the left BSM indicator 215

Blinking of the display lamp 220 of the meter device 216

Displaying of a predetermined attention call image by the MID 219 of the meter device 216

Sounding of the buzzer 218 of the meter device 216 (for example, the issuing of the beep sound)

Displaying of a predetermined attention call image by the display 224 of the multimedia device 217

Speaking of a predetermined voice announcement by the right speaker 222 and/or the left speaker 223 of the multimedia device 217 (for example, a voice such as "A vehicle is coming close from the rear. Pay attention")

The right BSM ECU 210 sends a secondary alarm issue command to a device that is used for issuing the secondary alarm (or a device that controls the device that is used for issuing the secondary alarm), and thereby can cause the device to issue the secondary alarm. That is, the right BSM ECU 210 controls a device that is used for issuing the secondary alarm (or a device that controls the device that is used for issuing the secondary alarm), and thereby can cause the device to issue the secondary alarm. The device continues to issue the secondary alarm, while the right BSM ECU 210 sends the secondary alarm issue command. Specifically, in the case where the secondary alarm is "blinking of the right BSM indicator 214", the right BSM ECU 210 sends the blinking command to the right BSM indicator 214 as the secondary alarm issue command, and thereby causes the right BSM indicator 214 to perform blinking. In the case where the secondary alarm is "blinking of the left BSM indicator 215", the right BSM ECU 210 sends the blinking command to the left BSM ECU 211 as the secondary alarm issue command. When the left BSM ECU 211 receives the secondary alarm issue command from the right BSM ECU 210, the left BSM ECU 211 sends the blinking command to the left BSM indicator 215, and thereby causes the left BSM indicator 215 to perform blinking.

In the case where the secondary alarm is "blinking of the display lamp 220 of the meter device 216", the right BSM ECU 210 sends the blinking command to the meter device 216 as the secondary alarm issue command, and thereby causes the display lamp 220 of the meter device 216 to perform blinking. In the case where the secondary alarm is "displaying of a predetermined attention call image by the MID 219 of the meter device 216", the right BSM ECU 210 sends the image display command to the meter device 216 as the secondary alarm issue command, and thereby causes the MID 219 to display the predetermined attention call image. In the case where the secondary alarm is "sounding of the buzzer 218 of the meter device 216", the right BSM ECU 210 sends the buzzer sounding command to the meter device 216 as the secondary alarm issue command, and thereby causes the buzzer 218 to sound.

In the case where the secondary alarm is "displaying of a predetermined attention call image by the display 224 of the multimedia device 217", the right BSM ECU 210 sends the image display command to the multimedia device 217 as the secondary alarm issue command, and thereby causes the display 224 of the multimedia device 217 to display the predetermined attention call image. In the case where the secondary alarm is "speaking of a predetermined voice announcement by the right speaker 222 and/or the left speaker 223 of the multimedia device 217", the right BSM ECU 210 sends the speech command to the multimedia device 217 as the secondary alarm issue command, and thereby causes the right speaker 222 and/or the left speaker 223 to speak the predetermined voice announcement.

The content of the attention call image that is displayed on the MID 219 of the meter device 216 and the content of the attention call image that is displayed on the display 224 of the multimedia device 217 may be different between the case where both conditions are satisfied for the right side of the vehicle 10 and the case where both conditions are satisfied for the left side of the vehicle 10. That is, an image having a content for calling attention for an occupant that attempts to get off the vehicle 10 from the right doors 102, 103 can be applied as an attention call image in the case where both conditions are satisfied for the right side of the vehicle 10, and an image having a content for calling attention for an occupant that attempts to get off the vehicle 10 from the left doors 104, 105 can be applied as an attention call image in the case where both conditions are satisfied for the left side of the vehicle 10. Similarly, the content of the predetermined voice announcement that is issued from the right speaker 222 and/or the left speaker 223 of the multimedia device 217 may be different between the case where both conditions are satisfied for the right side of the vehicle 10 and the case where both conditions are satisfied for the left side of the vehicle 10.

Further, a specific combination of the primary alarm and the second alarm is not particularly limited. Preferably, the primary alarm and the secondary alarm should be combined such that the secondary alarm has a higher level of attention call for the occupant than the primary alarm. As such a combination of the primary alarm and the second alarm, for example, the primary alarm does not include an alarm that can be recognized by auditory sense and includes an alarm that can be recognized by visual sense, and the secondary alarm includes an alarm that can be recognized by auditory sense. More specifically, as a combination that can be applied, the primary alarm is "lighting of the right BSM indicator 214 and/or the left BSM indicator 215", and the secondary alarm is a combination of "blinking of the right BSM indicator 214 and/or the left BSM indicator 215" and one of "sounding of the buzzer 218, displaying of a predetermined attention call image by the MID 119 and speaking of a predetermined voice announcement by the speaker 222 of the multimedia device 217". This is because the secondary alarm can have a higher level of attention call for the occupant than the primary alarm even when the vehicle 10 does not include the multimedia device 217 or even when the multimedia device 217 does not receive electric power and cannot act.

In the case where the primary alarm and the secondary alarm are "displaying of a predetermined attention call image by the MID 219 of the meter device 216" and "displaying of a predetermined attention call image by the display 224 of the multimedia device 217", the attention call image that is displayed as the secondary alarm is a different image from the attention call image that is displayed as the primary alarm, and is an image having a higher level of attention call for the occupant than the attention call image that is displayed as the primary alarm. For example, as a combination to be applied, the attention call image that is displayed as the primary alarm is a still image, and the attention call image that is displayed as the secondary alarm is a moving image.

The state where both conditions are satisfied includes a state (1) and a state (2) described below.

State (1): While the physical body condition is satisfied for at least one of the right side and left side of the vehicle 10, at least one door on the side for which the physical body condition is satisfied is switched from the close state to the open state.

State (2): While at least one door is in the open state, the physical body condition is satisfied for the side on which the door in the open state exists.

In the case of the state (1), the issuing of the secondary alarm is started at the time point when the door become the open state (that is, at the time point when the getting-off condition is satisfied). In the case of the state (2), the issuing of the secondary alarm is started at the time point when the physical body condition is satisfied.

Figure 3:
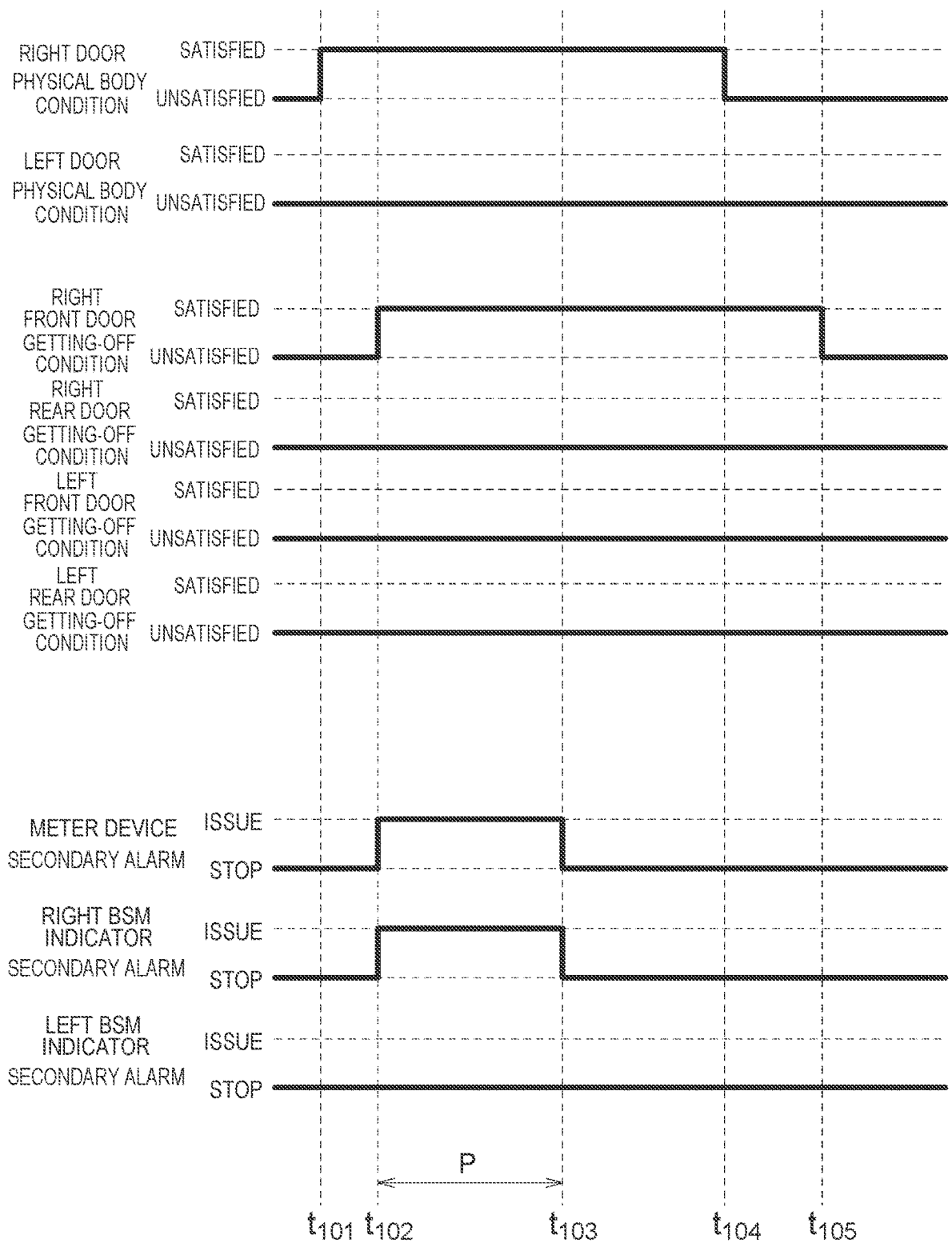
FIG. 3 is a time chart showing a behavior of the getting-off support device.

An example of the relation of the physical body condition, the getting-off condition and the secondary alarm will be described with reference to a time chart shown in FIG. 3. FIG. 3 is a time chart showing a behavior of the getting-off support device 20 in the case where the physical body condition is satisfied for the right side (right door) of the vehicle 10 and thereafter the getting-off condition is satisfied for the right front door 102, and is a basic example of issuing the secondary alarm. In this example, "blinking of the right BSM indicator 214 and/or the left BSM indicator 215" and "sounding of the buzzer 218 of the meter device 216" are applied as the secondary alarm.

Time point t101 in FIG. 3 is a time point when the physical body condition is satisfied for the right doors 102, 103, and time point t104 is a time point when the physical body condition satisfied at time point t101 is unsatisfied. Time point t102 is a time point when the getting-off condition is satisfied for the right front door 102, and time point t105 is a time point when the getting-off condition satisfied for the right front door 102 at time point t102 is unsatisfied. In this example, time point t102 is later than time point t101, and therefore time point t102 is a time point when both conditions are satisfied for the right front door 102. Therefore, the meter device 216 and the right BSM indicator 214 start to issue the secondary alarm at time point t102, and stop issuing the secondary alarm at time point t103 when the prescribed time P elapses from time point t102. That is, the meter device 216 and the right BSM indicator 214 continue to issue the secondary alarm from time point t102 to time point t103.

In some cases, it is determined that both conditions are satisfied multiple times at different time points. For example, an example (1) described below is assumed.

Example (1): While the physical body condition is satisfied for the right side (right door) of the vehicle 10, an occupant opens the right front door 102 for getting off the vehicle 10 from the right front door 102, and thereafter another occupant opens the right rear door 103 for getting off the vehicle 10 from the right rear door 103. In this case, the right BSM ECU 210 first determines that both conditions are satisfied for the right front door 102, and thereafter determines that both conditions are satisfied for the right rear door 103. In this case, the right BSM ECU 210 determines that both conditions are satisfied for the right front door 102 and the right rear door 103, at different time points.

In the case of the example (1), when the right BSM ECU 210 determines that both conditions are satisfied for the right front door 102, the right BSM ECU 210 sends the secondary alarm issue command to the meter device 216 and the right BSM indicator 214 for the prescribed time P. Therefore, the meter device 216 and the right BSM indicator 214 continue to issue the secondary alarm until the prescribed time P elapses from the time point when it is determined that both conditions are satisfied for the right front door 102, and finish issuing the secondary alarm at the time point when the prescribed time P elapses. However, when the issuing of the secondary alarm is stopped at the time point when the prescribed time P elapses from the time point when it is determined that both conditions are satisfied for the right front door 102 even in the case where it is determined that both conditions are satisfied for the right rear door 103 while the issuing of the secondary alarm is continued, the continuation time of issuing the secondary alarm for the occupant that attempts to get off the vehicle 10 from the right rear door 103 is shorter, so that there is fear that it is not possible to call attention to the physical body that comes close from the rearward side of the vehicle 10 (or there is fear that an insufficient attention call is performed).

Hence, in the embodiment, in the case where the secondary alarm is issued because it is determined that both conditions are satisfied for one door due to a certain event (first event) and where it is determined during the issuing of the secondary alarm that both conditions are satisfied for the one door or another door on the same side as the one door due to a different event (second event) from the above event (first event), the right BSM ECU 210 determines that the prolongation condition that is a condition for prolonging the continuation time of issuing the secondary alarm is satisfied, and prolongs the continuation time of issuing the secondary alarm. Specifically, the right BSM ECU 210 sets the time point of the stop of issuing the secondary alarm, to a time point when the prescribed time P elapses from the occurrence of the second event, instead of a time point when the prescribed time P elapses from the occurrence of the first event. Therefore, the continuation time of issuing the secondary alarm is prolonged from "the prescribed time P" to the total time of "a time from the occurrence of the first event to the occurrence of the second event" and "the prescribed time P".

In the example (1), "the right front door 102 is switched from the close state to the open state while the physical body condition is satisfied for the right side (right door)" corresponds to the first event, and "the right rear door 103 is switched from the close state to the open state while the physical body condition is satisfied for the right side (right door)" corresponds to the second event.

While the secondary alarm is issued because it is determined that both conditions are satisfied due to the second event, it is sometimes further determined that both conditions are satisfied for one door due to a third event that is different from the first event and the second event. In this case, the right BSM ECU 210 determines that the prolongation condition is satisfied, and further prolongs the continuation time of issuing the secondary alarm. Specifically, the getting-off support device 20 sets the time point of the stop of issuing the secondary alarm, to a time point when the prescribed time P elapses from the occurrence of "the third event". In this way, in the case where "the secondary alarm is issued because it is determined that both conditions are satisfied due to a certain event and it is determined during the issuing of the secondary alarm that both conditions are satisfied for at least one door due to another event that is different from the certain event" is repeated, the continuation time of issuing the secondary alarm is repeatedly prolonged.

Figure 4:
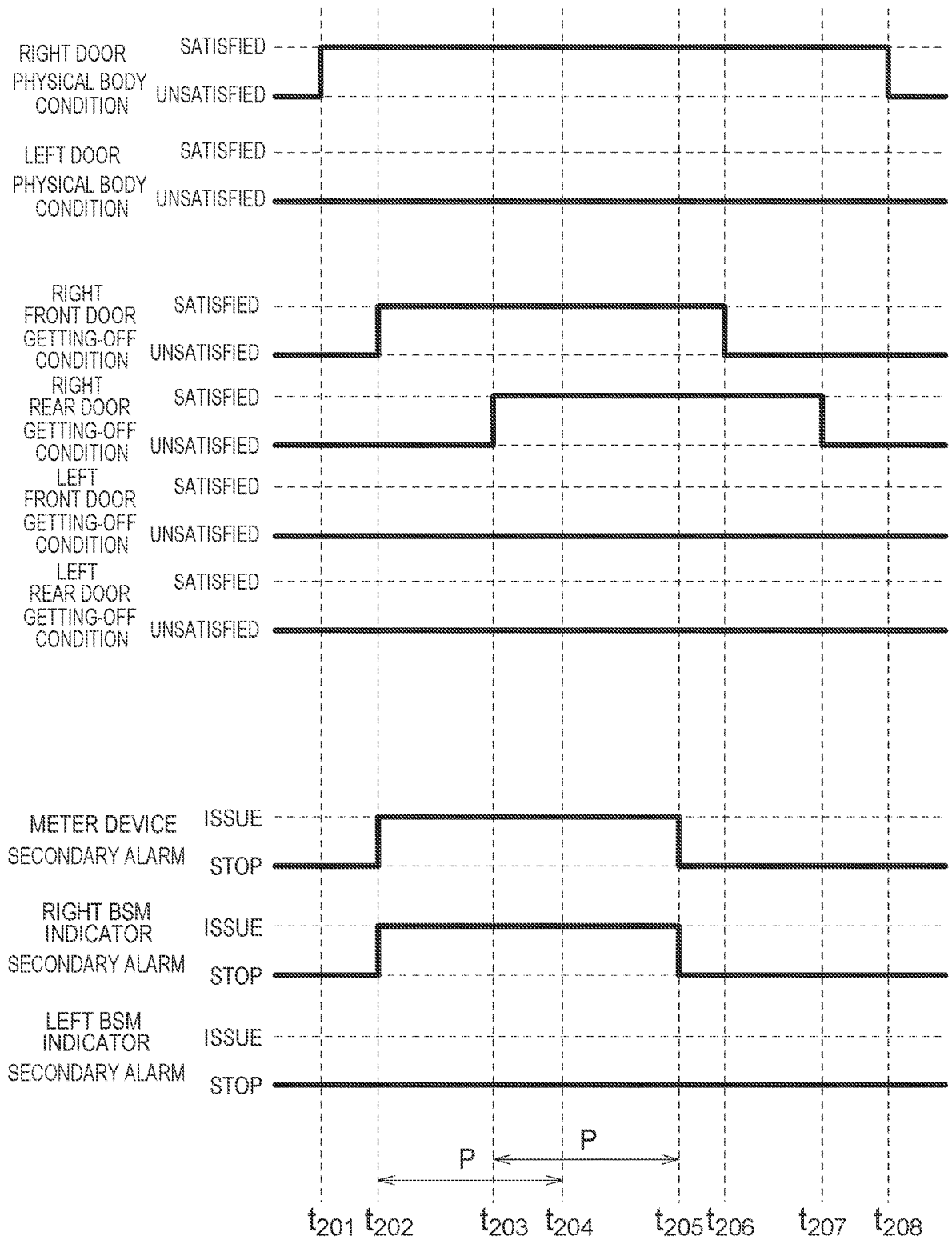
FIG. 4 is a time chart showing a behavior of the getting-off support device.

The relation of the physical body condition, the getting-off condition and the secondary alarm in the example (1) will be described with reference to FIG. 4. FIG. 4 is a time chart showing a behavior of the getting-off support device 20 in the case of the example (1). Time point t201 in FIG. 4 is a time point when the physical body condition is satisfied for the right doors 102, 103, and time point t208 is a time point when the physical body condition satisfied at time point t201 is unsatisfied. Time point t202 is a time point when the getting-off condition is satisfied for the right front door 102, and time point t206 is a time point when the getting-off condition satisfied for the right front door 102 at time point t202 is unsatisfied. In this example, time point t202 is later than time point t201, and therefore time point t202 is a time point when both conditions are satisfied for the right front door 102. Therefore, the meter device 216 and the right BSM indicator 214 start to issue the secondary alarm at time point t202.

Time point t203 is a time point when the getting-off condition is satisfied for the right rear door 103. Time point t207 is a time point when the getting-off condition is unsatisfied for the right rear door 103. The physical body condition is satisfied for the right doors 102, 103 at time point t203, and therefore both conditions are satisfied for the right rear door 103 at time point t203. Further, time point t203 is earlier than time point t204 when the prescribed time P elapses from time point t202, and therefore the issuing of the secondary alarm started at time point t202 is continued. Therefore, at time point t203, it is determined that the prolongation condition for the meter device 216 and the right BSM indicator 214 is satisfied. Then, the issuing of the secondary alarm is continued until time point t205 when the prescribed time P elapses from time point t203. That is, the issuing of the secondary alarm is prolonged from time point t204 (the time point when the prescribed time P elapses from time point t202) to time point t205.

The meter device 216 issues the secondary alarm in each of the case where it is determined that both conditions are satisfied for the right doors 102, 103 and the case where both conditions are satisfied for the left doors 104, 105. In contrast, each of the right BSM indicator 214 and the left BSM indicator 215 issues the secondary alarm in the case where both conditions are satisfied for a door on the provision side, and does not issue the secondary alarm in the case where both conditions are satisfied for a door on the opposite side of the provision side. Therefore, the manner of the prolongation of the secondary alarm of the meter device 216 is different from that of the right BSM indicator 214 and the left BSM indicator 215. Specific descriptions will be shown below.

Figure 5:
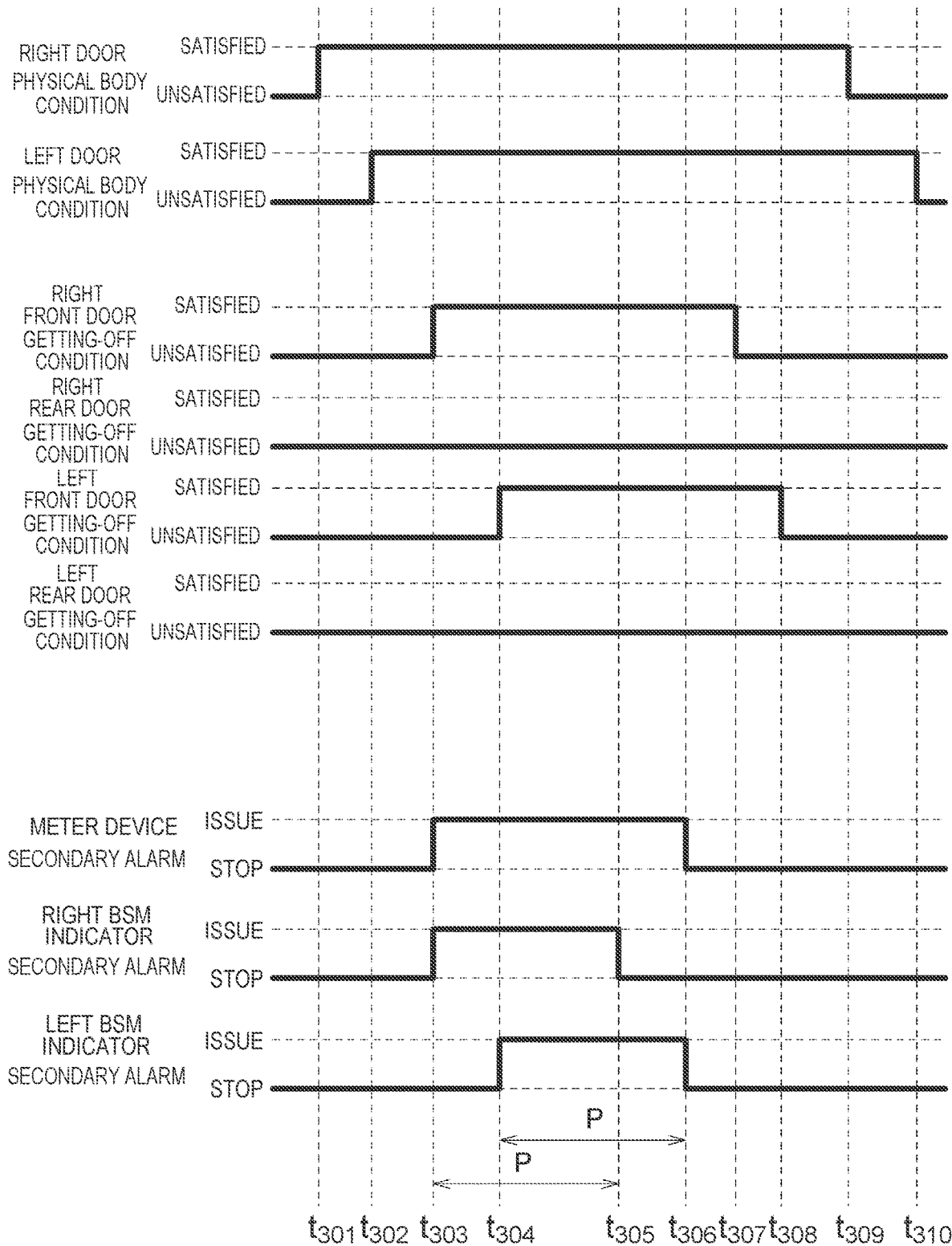
FIG. 5 is a time chart showing a behavior of the getting-off support device.

A case where the right front door 102 of the vehicle 10 is first opened and the left front door 104 is subsequently opened while the physical body condition is satisfied for both of the right side and left side of the vehicle 10 is shown as an example. FIG. 5 is a time chart showing a behavior of the getting-off support device 20 in this example. Time point t301 in FIG. 5 is a time point when the physical body condition is satisfied for the right doors 102, 103, and time point t309 is a time point when the physical body condition satisfied at time point t301 is unsatisfied. Time point t302 is a time point when the physical body condition is satisfied for the left doors 104, 105, and time point t310 is a time point when the physical body condition satisfied for the left doors 104, 105 at time point t302 is unsatisfied. Time point t303 is a time point when the getting-off condition is satisfied for the right front door 102. Time point t307 is a time point when the getting-off condition satisfied for the right front door 102 at time point t303 is unsatisfied.

In this example, time point t303 is later than time point t301, and therefore time point t303 is a time point when both conditions are satisfied for the right front door 102. In this case, the right BSM ECU 210 sends the secondary alarm issue command to the meter device 216 and the right BSM indicator 214. Therefore, the meter device 216 and the right BSM indicator 214 start to issue the secondary alarm at time point t303.

Time point t304 is a time point when the getting-off condition is satisfied for the left front door 104. In this example, time point t304 is later than time point t302, and therefore time point t304 is a time point when both conditions are satisfied for the left front door 104. At time point t304, the right BSM ECU 210 determines that the prolongation condition is satisfied for the meter device 216, but does not determine that the prolongation condition is satisfied for the right BSM indicator 214. Further, at time point t304, the right BSM ECU 210 sends the secondary alarm issue command to the left BSM indicator 215. Therefore, at time point t304, the left BSM indicator 215 starts to issue the secondary alarm. Time point t304 is earlier than time point t305 when the prescribed time P elapses from time point t303. Therefore, at time point t304, the meter device 216 and the right BSM indicator 214 continue to issue the secondary alarm. Moreover, the right BSM ECU 210 prolongs the issuing of the secondary alarm by the meter device 216. Specifically, the right BSM ECU 210 newly starts to measure the elapsed time from time point t304 when it is determined that the getting-off condition is satisfied because the left front door 104 is opened. The right BSM ECU 210 continues to measure the elapsed time from time point t303 when it is determined that the getting-off condition is satisfied because the right front door 102 is opened.

Then, based on the first started time measurement, the right BSM ECU 210 stops sending the secondary alarm issue command to the right BSM indicator 214, at time point t305 when the prescribed time P elapses from time point t303 when it is determined that the getting-off condition is satisfied for the right front door 102. Thereby, at time point t305, the right BSM indicator 214 stops issuing the secondary alarm. Meanwhile, at time point t305, the prescribed time P does not still elapse from time point t304. Therefore, the right BSM ECU 210 continues to send the secondary alarm issue command to the meter device 216. Then, the right BSM ECU 210 stops sending the secondary alarm issue command to the meter device 216 at time point t306 when the prescribed time P elapses from time point t304.

In this way, even in the case where the right BSM indicator 214 issues the secondary alarm and where both conditions are satisfied for the left doors 104, 105 during the issuing of the secondary alarm (t303 to t305) due to another event different from an event that causes the issuing of the secondary alarm, the issuing of the secondary alarm by the right BSM indicator 214 is not influenced. That is, for the right BSM indicator 214, it is not determined that the prolongation condition is satisfied, even when both conditions are satisfied for the left doors 104, 105 during the issuing of the secondary alarm. Therefore, when the prescribed time P elapses after the start of issuing the secondary alarm, the right BSM indicator 214 stops issuing the secondary alarm without the prolongation.

On the other hand, in the case where the meter device 216 issues the secondary alarm and where both conditions are satisfied for the left doors 104, 105 during the issuing of the secondary alarm (t303 to t305) due to another event different from an event that causes the issuing the secondary alarm, the issuing of the secondary alarm by the meter device 216 is influenced. Therefore, the meter device 216 does not stop issuing the secondary alarm at time point t305, and prolongs the issuing of the secondary alarm to time point t306 when the prescribed time P elapses from the time point t304 when both conditions are satisfied for the left door 104, 105. That is, in this case, the issuing of the secondary alarm by the meter device 216 is not stopped at the time point when the prescribed time P elapses from "the time point when it is determined that the getting-off condition is satisfied for the right front door 102", and is stopped at the time point when the prescribed time P elapses from "the time point when it is determined that the getting-off condition is satisfied for the left front door 104". That is, the continuation time of issuing the secondary alarm by the meter device 216 is prolonged.

In this way, in the case where both conditions are satisfied for one of the right and left doors during the issuing of the secondary alarm due to another event, the meter device 216, which is a device that issues the secondary alarm in the case where both conditions are satisfied for any of the right and left doors, continues to issue the secondary alarm until the prescribed time P elapses from the time point when it is determined later that both conditions are satisfied, regardless of whether the door for which both conditions are satisfied is a door provided on the right side or a door provided on the left side. In the case where it is further determined that both conditions are satisfied for one door due to another event while the issuing of the secondary alarm is prolonged because the both conditions are satisfied, the issuing of the secondary alarm is further prolonged. That is, in this case, the issuing of the secondary alarm is started from "the time point when it is determined at the first timing that both conditions are satisfied", and the issuing of the secondary alarm is continued until the prescribed time P elapses from "the time point when it is determined at the last timing that both conditions are satisfied".

In the case where both conditions are further satisfied for a door on the same side during the issuing of the secondary alarm due to another event, the right BSM indicator 214 and the left BSM indicator 215, each of which is a device that issues the secondary alarm in the case where it is determined that both conditions are satisfied for a door on the right side or the left side, continue to issue the secondary alarm until the prescribed time P elapses from the time point when it is further determined that both condition are satisfied. That is, the continuation time of issuing the secondary alarm is prolonged. On the other hand, in the case where both conditions are further satisfied for a door on the different side during the continuation of issuing the secondary alarm, the right BSM indicator 214 and the left BSM indicator 215 stop issuing the secondary alarm when the prescribed time P elapses from the time point when it is first determined that both conditions are satisfied. That is, the continuation time of issuing the secondary alarm is not prolonged. In this way, for devices that issue the secondary alarm in the case where it is determined that both conditions are satisfied for a door on a particular one of the right side and the left side, in the case where both conditions are further satisfied for a door on the same side as the particular one side during the issuing of the secondary alarm, it is determined that the prolongation condition is satisfied. On the other hand, for such devices, in the case where both conditions are further satisfied for a door on the different side from the particular one side during the issuing of the secondary alarm, it is not determined that the prolongation condition is satisfied.

In configurations in each of which a single device issues the secondary alarm in the case where both conditions are satisfied on both of the right side and left side of the vehicle 10, "the secondary alarm that is issued in the case where both conditions are satisfied for the right side of the vehicle 10" and "the secondary alarm that is issued in the case where both conditions are satisfied for the left side of the vehicle 10" may be different in content from each other.

With this configuration, for example, in the case where the secondary alarm is issued because it is detected that an occupant attempts to get off the vehicle 10 from one door and where it is detected during the issuing of the secondary alarm that an occupant attempts to get off the vehicle 10 from another door, it is possible to call attention also for the occupant that attempts to get off the vehicle 10 from the other door. Further, with this configuration, the secondary alarm is continued (that is, the secondary alarm is prolonged) for the predetermined time (prescribed time P) after it is detected that the occupant attempts to get off the vehicle 10 from the other door, and therefore it is possible to avoid a strangeness feeling from being given to the occupant that attempts to get off the vehicle 10 from the other door.

Furthermore, in the case where the BSM indicator for one side of the right side and the left side issues the secondary alarm because it is detected that an occupant attempts to get off the vehicle 10 from a door on the one side and where it is detected during the issuing of the secondary alarm that an occupant attempts to get off the vehicle 10 from a door on the opposite side, the secondary alarm by the BSM indicator for the one side is not prolonged. The BSM indicator for the side corresponding to the door on the opposite side continues to issue the secondary alarm for the prescribed time P after both conditions are satisfied for the door on the opposite side. Accordingly, it is possible to issue an appropriate alarm for each occupant, and it is possible to avoid each occupant from having a strangeness feeling about the secondary alarm by the BSM indicator.

Specific Behavior

Figure 6:
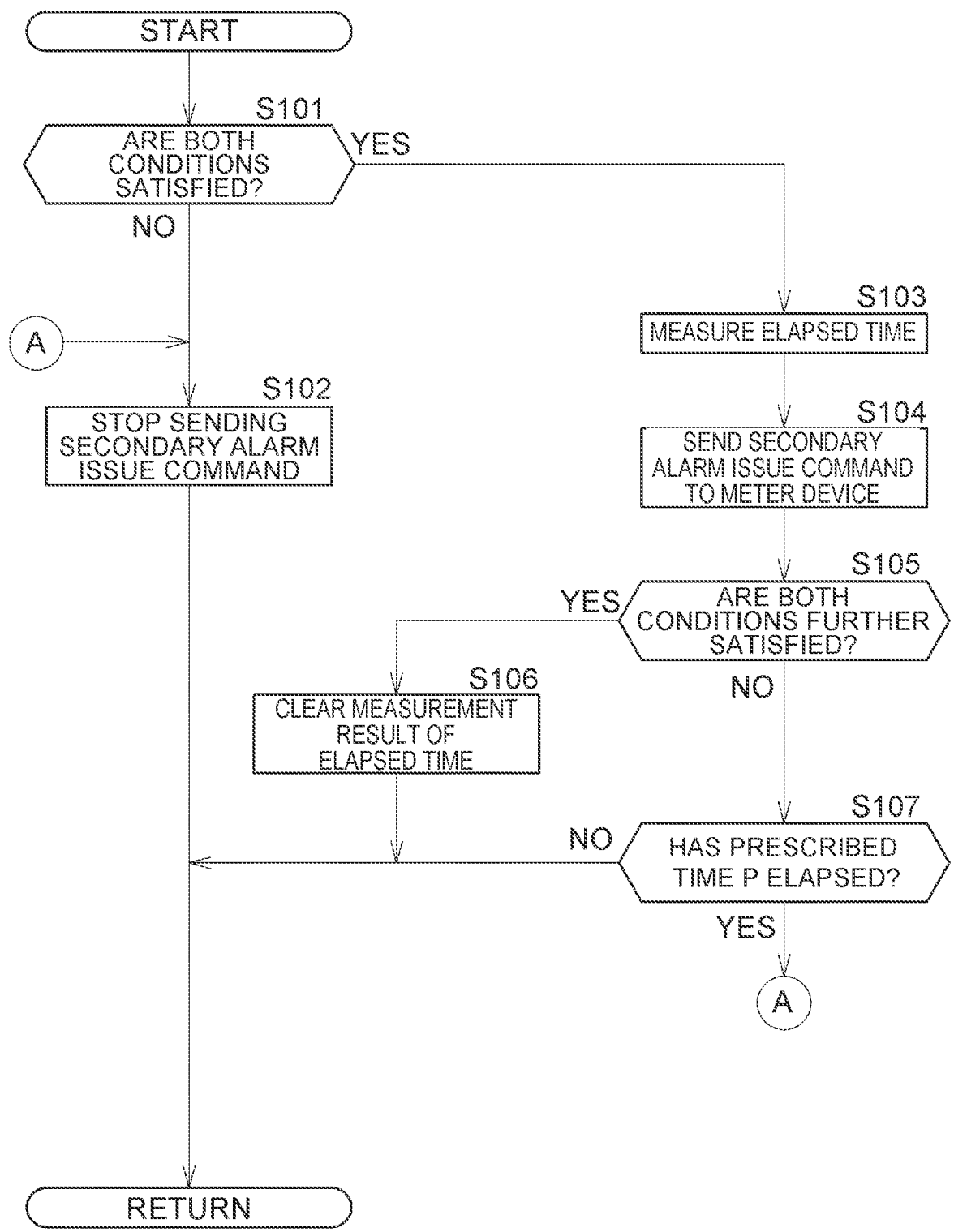
FIG. 6 is a flowchart showing a getting-off support routine.
Figure 7:
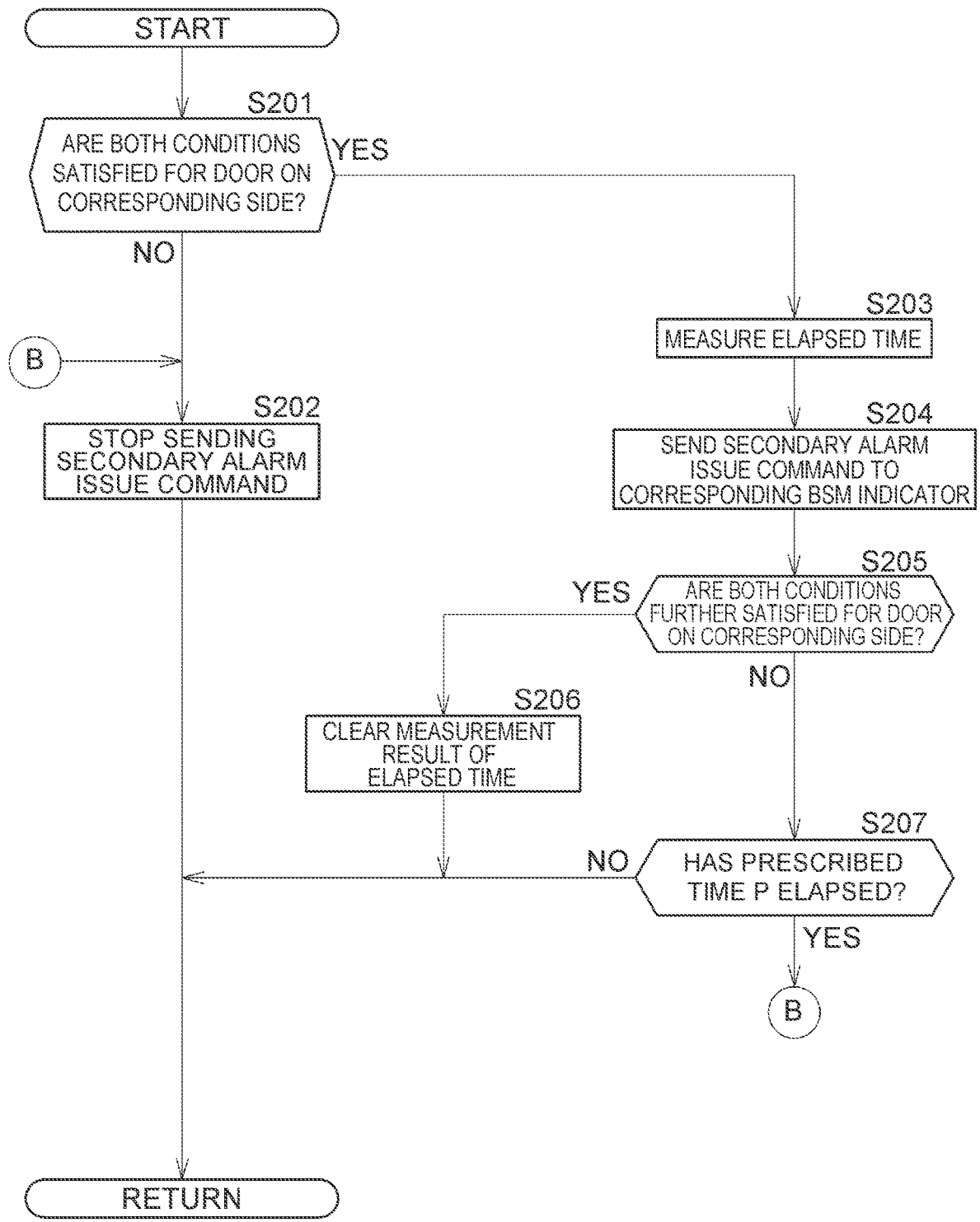
FIG. 7 is a flowchart showing a getting-off support routine.

Next, a specific behavior of the right BSM ECU 210 will be described. In this example, "blinking of the right BSM indicator 214 and/or the left BSM indicator 215" and "sounding of the buzzer 218 of the meter device 216" are applied as the secondary alarm. FIG. 6 and FIG. 7 are flowcharts showing getting-off support routines that are executed by the CPU of the right BSM ECU 210. FIG. 6 shows a getting-off support routine relevant to the meter device 216, and FIG. 7 shows a getting-off support routine relevant to the right BSM indicator 214 and the left BSM indicator 215. The CPU of the right BSM ECU 210 repeatedly executes the getting-off support routines shown in FIG. 6 and FIG. 7 in parallel, with a predetermined period. A computer program for executing the getting-off support routines is previously stored in the ROM of the right BSM ECU 210. The CPU of the right BSM ECU 210 reads the computer program from the ROM, and expands and executes the computer program on the RAM. Thereby, the getting-off support control is realized. In the following description, the CPU of the right BSM ECU 210 is sometimes abbreviated as merely "CPU".

Getting-Off Support Routine Relevant to Meter Device

In step S101, the CPU determines whether both conditions are satisfied for each of the doors 102, 103, 104, 105. In the case where the CPU determines that both conditions are not satisfied for each of the doors 102, 103, 104, 105, the CPU proceeds to step S102. In the case where the CPU determines in step S101 that both conditions are satisfied for one door, the CPU proceeds to step S103.

In the case where the CPU is sending the secondary alarm issue command (buzzer sounding command) to the meter device 216, the CPU stops sending the secondary alarm issue command in step S102. In the case where the CPU proceeds to step S102 before the prescribed time P elapses from the start of the sending of the secondary alarm issue command, the CPU continues to send the secondary alarm issue command for a predetermined time after it is determined in step S101 that both conditions are not satisfied, and thereafter stops sending the secondary alarm issue command. Further, in the case where the CPU is not sending the secondary alarm issue command to the meter device 216, the CPU maintains the state where the CPU is not sending the secondary alarm issue command. Then, the CPU ends the getting-off support routine once.

In step S103, the CPU starts to measure the elapsed time from the time point when both conditions are satisfied for one door. In the case where the CPU has already started to measure the elapsed time, the CPU continues to measure the elapsed time with no change. Then, the CPU proceeds to step S104.

In step S104, the CPU starts to send the buzzer sounding command to the meter device 216 as the secondary alarm issue command. Thereby, the meter device 216 starts to issue the secondary alarm. In the case where the CPU has started to send the secondary alarm issue command, the CPU continues to send the secondary alarm issue command. In this case, the meter device 216 continues to issue the secondary alarm. Then, the CPU proceeds to step S105.

In step S105, the CPU determines whether both conditions are satisfied due to another event different from the event determined in step S101. For example, the CPU determines whether both conditions are satisfied for another door different from the door for which it is determined in step S101 that both conditions are satisfied. In the case where the CPU determines that both conditions are further satisfied, the CPU proceeds to step S106. In the case where the CPU does not determine that both conditions are further satisfied, the CPU proceeds to step S107.

In step S106, the CPU clears the measurement result of the elapsed time in step S103 (that is, the CPU adjusts the elapsed time to "0"). Then, the CPU ends the getting-off support routine once while maintaining the state where the CPU is sending the secondary alarm issue command to the meter device 216. Therefore, in the case where the CPU proceeds to step S103 after that, the CPU measures the elapsed time from the time point when it is determined in step S104 that both conditions are satisfied, in step S103.

In step S107, the CPU determines whether the elapsed time measured in step S103 has reached the prescribed time P. That is, the CPU determines whether the prescribed time P has elapsed from "the time point when it is determined at the last timing that both conditions are satisfied" for one door included in the vehicle 10. Then, in the case where the CPU determines that the prescribed time P has not elapsed, the CPU ends the getting-off support routine once while maintaining the state where the CPU is sending the secondary alarm issue command to the meter device 216. Accordingly, in this case, the meter device 216 continues to issue the secondary alarm. On the other hand, in the case where the CPU determines that the prescribed time P has elapsed, the CPU proceeds to step S102. Accordingly, in this case, the CPU stops sending the secondary alarm issue command. Thereby, the meter device 216 stops issuing the secondary alarm. Then, the CPU ends the getting-off support routine once.

Getting-Off Routine Relevant to Right BSM Indicator 214 and Left BSM Indicator 215

The CPU executes the getting-off support routine shown in FIG. 7, for each of the right BSM indicator 214 and the left BSM indicator 215. In the following description and FIG. 7, "the door on the corresponding side" and "the corresponding BSM indicator" mean "the right doors 102, 103" and "the right BSM indicator 214" in the case of the getting-off support routine for the right BSM indicator 214, and mean "the left doors 104, 105" and "the left BSM indicator 215" in the case of the getting-off support routine for the left BSM indicator 215. Furthermore, in the following description and FIG. 7, a description "the CPU sends the secondary alarm issue command (blinking command) to the corresponding BSM indicator" means "the CPU sends the secondary alarm issue command to the right BSM indicator 214" in the case where the corresponding BSM indicator is the right BSM indicator 214, and means "the CPU sends the secondary alarm issue command to the left BSM ECU 211" in the case where the corresponding BSM indicator is the left BSM indicator 215.

In step S201, the CPU determines whether both conditions are satisfied, for the door on the corresponding side. In the case where the CPU determines that both conditions are not satisfied for each door on the corresponding side, the CPU proceeds to step S202. On the other hand, in the case where the CPU determines that both conditions are satisfied for at least one door on the corresponding side, the CPU proceeds to step S203.

In the case where the CPU is sending the secondary alarm issue command (blinking command) to the corresponding BSM indicator, the CPU stops sending the secondary alarm issue command in step S202. In the case where the CPU proceeds to step S202 before the prescribed time P elapses from the start of the sending of the secondary alarm issue command, the CPU continues to send the secondary alarm issue command for a predetermined time after it is determined in step S201 that both conditions are not satisfied, and thereafter stops sending the secondary alarm issue command. Further, in the case where the CPU is not sending the secondary alarm issue command to the corresponding BSM indicator, the CPU maintains the state where the CPU is not sending the secondary alarm issue command. Then, the CPU ends the getting-off support routine once.

In step S203, the CPU starts to measure the elapsed time from the time point when both conditions are satisfied for the door on the corresponding side. In the case where the CPU has already started to measure the elapsed time, the CPU continues to measure the elapsed time. Then, the CPU proceeds to step S204.

In step S204, the CPU sends the secondary alarm issue command to the corresponding BSM indicator. In the case where the CPU is sending the secondary alarm issue command, the CPU continues to send the secondary alarm issue command with no change. Then, the CPU proceeds to step S205.

In step S205, the CPU determines whether both conditions are further satisfied for the door on the corresponding side after the start of the time measurement in step S203. In the case where the CPU determines whether both conditions are further satisfied for the door on the corresponding side, the CPU proceeds to step S206. In the case where the CPU does not determine that both conditions are further satisfied (that is, in the case where both conditions are not satisfied for each side or in the case where both conditions are satisfied for only the door of the opposite side of the corresponding side), the CPU proceeds to step S207.

In step S206, the CPU clears the measurement result of the elapsed time before the current time point (the CPU adjusts the elapsed time to "0"). Then, the CPU ends the getting-off support routine once while maintaining the state where the CPU is sending the secondary alarm issue command to the corresponding BSM indicator. Therefore, in the case where the CPU proceeds to step S203 after that, the CPU measures the elapsed time from the time point when it is determined in step S205 that both conditions are further satisfied for the door on the corresponding side, in step S203.

In step S207, the CPU determines whether the elapsed time measured in step S203 has reached the prescribed time P. That is, the CPU determines whether the prescribed time P has elapsed from "the time point when it is determined at the last timing that both conditions are satisfied" for at least one door on the corresponding side. Then, in the case where the CPU determines that the prescribed time P has not elapsed, the CPU ends the getting-off support routine once while continuing to send the secondary alarm issue command to the corresponding BSM indicator. On the other hand, in the case where the prescribed time P has elapsed, the CPU proceeds to step S202. In this case, in step S202, the CPU stops sending the secondary alarm issue command to the corresponding BSM indicator. Thereby, the corresponding BSM indicator stops issuing the secondary alarm. Then, the CPU ends the getting-off support routine once.

In the getting-off support routines, in the case where it is determined that both conditions are not satisfied for each of the right side and the left side of the vehicle 10 ("No" in steps S101, step S201), the secondary alarm is not issued (steps S102, S202).

On the other hand, in the case where it is determined that both conditions are satisfied for one of the right side and left side of the vehicle 10 ("Yes" in steps S101, S201), the meter device 216 issues the secondary alarm (step S104), and the corresponding BSM indicator issues the secondary alarm (S204).

Then, in the case where both conditions are further satisfied for one of the right side and left side of the vehicle 10 while the meter device 216 and the right BSM indicator 214 or left BSM indicator 215 continue to issue the secondary alarm ("Yes" in step S105), the CPU clears the measurement result of the elapsed time (step S106), and thereby prolongs the issuing of the secondary alarm by the meter device 216. Similarly, in the case where both conditions are satisfied for a door on the same side as the BSM indicator that is issuing the secondary alarm ("Yes" in step S205), the CPU clears the measurement result of the elapsed time (step S206). Thereby the secondary alarm from the BSM indicator that is issuing the secondary alarm is prolonged. On the other hand, even when both conditions are satisfied for a door on the opposite side of the BSM indicator that is issuing the secondary alarm, the determination of "No" is made in step S205, and therefore the secondary alarm from the BSM indicator that is issuing the secondary alarm is not prolonged.

Second Embodiment

Next, a second embodiment will be described. A getting-off support device 20 according to the second embodiment is different from the getting-off support device 20 according to the first embodiment, mainly in the manner of issuing the secondary alarm. The same configurations and contents as those in the first embodiment can be applied to the device configuration, physical body condition, getting-off condition and primary alarm in the getting-off support device 20 according to the second embodiment. Therefore, the descriptions of the same configurations and contents as those in the first embodiment are omitted.

Secondary Alarm

In the embodiment, an alarm that can be repeatedly issued (in other words, an alarm for which the number of times of issuing can be measured) is applied as the secondary alarm. Specifically, a single or a plurality of examples of the following examples is applied as the secondary alarm.

Blinking of the right BSM indicator 214 and/or the left BSM indicator 215

Blinking of the display lamp 220 of the meter device 216

Displaying of a predetermined attention call image by the MID 219 of the meter device 216 (displaying of a moving image in which a predetermined motion is repeated instead of a still image, or intermittent displaying (repeat of displaying and non-displaying) of a still image)

Sounding of the buzzer 218 of the meter device 216 (an intermittent sound for which the number of times of issuing can be measured, instead of a continuous sound).

Displaying of a predetermined attention call image by the display 224 of the multimedia device 217 (displaying of a moving image in which a predetermined motion is repeated instead of a still image, or intermittent displaying (repeat of displaying and non-displaying) of a still image)

Speaking of a predetermined voice announcement by the right speaker 222 and/or the left speaker 223 of the multimedia device 217

When both conditions are satisfied, the getting-off support device 20 repeatedly issues the secondary alarm, and when the number of time of issuing reaches a predetermined number of times, the getting-off support device 20 stops issuing the secondary alarm. The number of times of issuing the secondary alarm is previously set. Hereinafter, "the number of times that is previously set" is referred to as a "prescribed times-number Q". Further, in the case where it is determined that a "times-number increase condition" that is a condition for increasing the number of times of issuing the secondary alarm is satisfied, the getting-off support device 20 increases the number of times of the repeat of issuing the secondary alarm relative to the prescribed times-number Q.

That is, in the case where the secondary alarm includes "blinking of the right BSM indicator 214 and/or the left BSM indicator 215" and "blinking of the display lamp 220 of the meter device 216", the number of times of issuing the right BSM indicator 214 and/or the left BSM indicator 215 and the display lamp 220 is increased relative to the prescribed times-number Q, when the times-number increase condition is satisfied. In the case where the secondary alarm is "displaying of a predetermined attention call image by the MID 219 of the meter device 216", the number of times of the playback of the moving image as the attention call image or the number of intermittent displays of the still image is increased, when the times-number increase condition is satisfied. In the case where the secondary alarm is "sounding of the buzzer 218 of the meter device 216", the number of times of the speech is increased relative to the prescribed times-number Q, when the times-number increase condition is satisfied. In the case where the secondary alarm is "displaying of a predetermined attention call image by the display 224 of the multimedia device 217", the number of times of the playback of the moving image as the attention call image or the number of intermittent displays of the still image is increased, when the times-number increase condition is satisfied. In the case where the secondary alarm is "speaking of a predetermined voice announcement by the right speaker 222 and/or the left speaker 223 of the multimedia device 217", the number of times of the playback of the voice announcement is increased relative to the prescribed times-number Q, when the times-number increase condition is satisfied.

The same condition as the "prolongation condition" in the first embodiment is applied as the times-number increase condition. For example, in the case where the issuing of the secondary alarm is repeated because it is determined that both conditions are satisfied due to a certain event (first event) and where it is determined during the repeat of issuing the secondary alarm that both conditions are satisfied due to a different event (second event) from the certain event, the getting-off support device 20 determines that the times-number increase condition is satisfied. Then, the getting-off support device 20 repeats the issuing of the secondary alarm the prescribed times-number Q, from the time point when the times-number increase condition is satisfied. Therefore, the number of times of the repeat of the secondary alarm is the total of "the number of times of issuing after it is determined that both conditions are satisfied for one door due to the first event and before it is determined that both conditions are satisfied for the one door or another door due to the second event" and "the prescribed times-number Q", and is more than "the prescribed times-number Q". Further, similarly to the first embodiment, in the case of repeat of "the secondary alarm is issued because both conditions are satisfied for a certain door due to a certain event and it is determined during the issuing of the secondary alarm that both conditions are satisfied for the certain door or another door due to a different event from the certain event", the number of times of issuing the secondary alarm is repeatedly increased.

With this configuration, it is possible to exert the same effect as that in the first embodiment.

Specific Behavior

Figure 8:
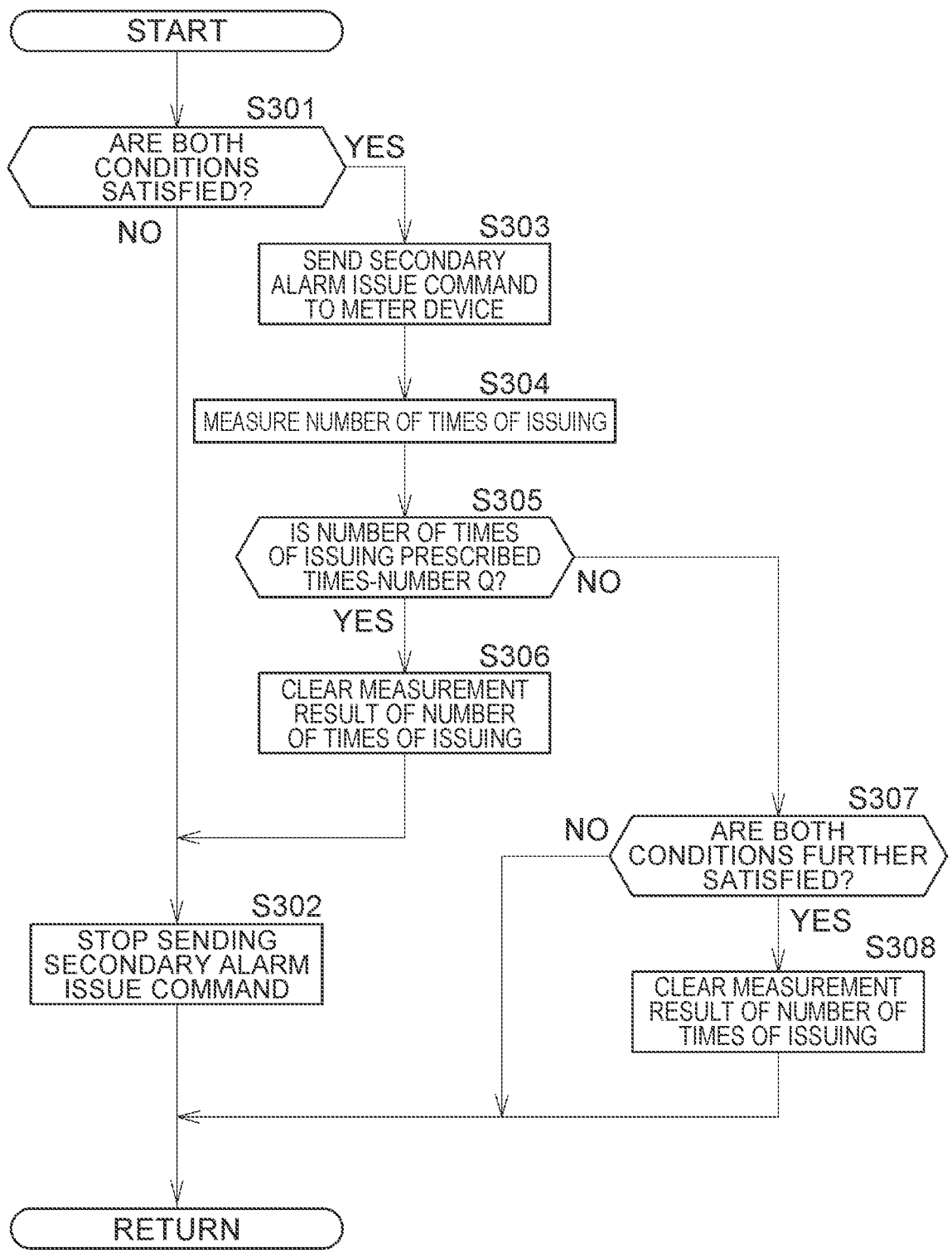
FIG. 8 is a flowchart showing a getting-off support routine.
Figure 9:
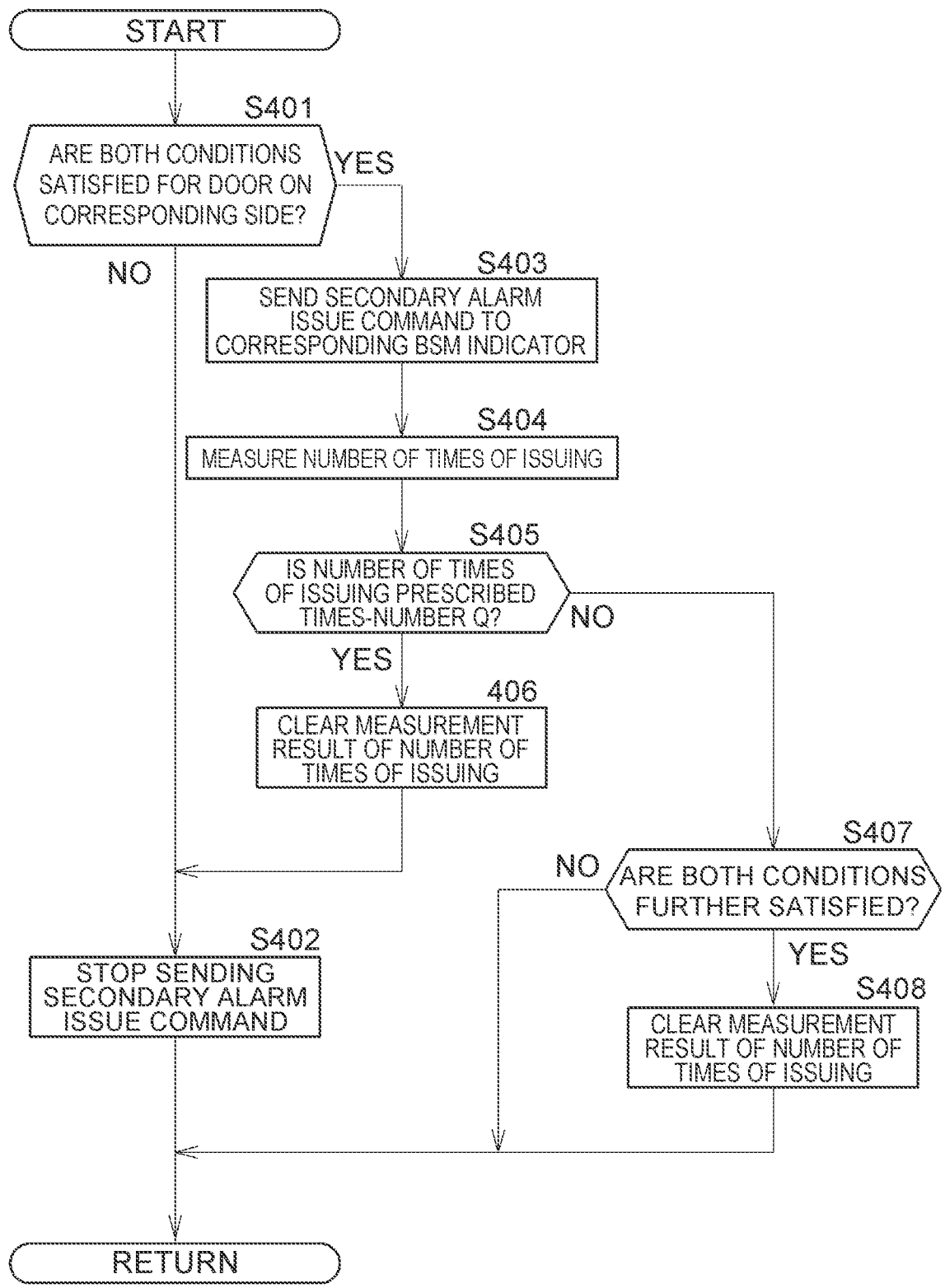
FIG. 9 is a flowchart showing a getting-off support routine.

Next, a specific behavior of the right BSM ECU 210 will be described. In this example, "sounding of the buzzer 218 of the meter device 216" and "blinking of the right BSM indicator 214 and/or the left BSM indicator 215" are applied as the secondary alarm. FIG. 8 and FIG. 9 are flowcharts showing getting-off support routines that are executed by the CPU of the right BSM ECU 210. FIG. 8 shows a getting-off support routine relevant to the meter device 216, and FIG. 9 shows a getting-off support routine relevant to the right BSM indicator 214 and the left BSM indicator 215. The CPU of the right BSM ECU 210 repeatedly executes the getting-off support routines shown in FIG. 8 and FIG. 9 in parallel, with a predetermined period.

Getting-Off Support Routine Relevant to Meter Device 216

In step S301, the CPU determines whether both conditions are satisfied for each of the doors 102, 103, 104, 105. In the case where the CPU determines that both conditions are not satisfied for each door, the CPU proceeds to step S302. On the other hand, in the case where the CPU determines that both conditions are satisfied for at least one door, the CPU proceeds to step S303.

In the case where the CPU is sending the secondary alarm issue command (buzzer sounding command) to the meter device 216, the CPU stops sending the secondary alarm issue command in step S302. In the case where the CPU proceeds to step S302 before the number of times of issuing the secondary alarm reaches the prescribed times-number Q from the start of the sending of the secondary alarm issue command, the CPU continues to send the secondary alarm issue command such that the secondary alarm is issued a predetermined number of times after it is determined that both conditions are not satisfied in step S301, and thereafter stops sending the secondary alarm issue command. Further, in the case where the CPU is not sending the secondary alarm issue command to the meter device 216, the CPU maintains the state where the CPU is not sending the secondary alarm issue command. Then, the CPU ends the getting-off support routine once.

In step S303, the CPU sends the secondary alarm issue command to the meter device 216. In the case where the CPU is sending the secondary alarm issue command at the time point when the CPU proceeds to step S303, the CPU continues to send the secondary alarm issue command. Thereby, the meter device 216 issues the secondary alarm. Then, the CPU proceeds to step S304.

In step S304, the CPU counts the number of times of issuing the secondary alarm by the meter device 216. In the case where the CPU has already started the counting, the CPU continues the counting. Then, the CPU proceeds to step S305.

In step S305, the CPU determines whether the number of times of issuing the secondary alarm by the meter device 216 has reached the prescribed times-number Q. In the case where the number of times of issuing the secondary alarm by the meter device 216 has reached the prescribed times-number Q, the CPU proceeds to step S306. In the case where the number of times of issuing the secondary alarm by the meter device 216 has not reached the prescribed times-number Q, the CPU proceeds to step S307.

In step S306, the CPU clears the number of times of issuing the secondary alarm that is counted in step S304 (the CPU adjusts the measurement result of the number of times of issuing to "0"). Then, the CPU proceeds to step S302. When the CPU proceeds to step S302, the CPU stops sending the secondary alarm issue command to the meter device 216. Thereby, the meter device 216 stops issuing the secondary alarm. Then, the CPU ends the getting-off support routine once.

In step S307, the CPU determines whether both conditions are further satisfied. In the case where the CPU does not determine that both conditions are further satisfied, the CPU ends the getting-off support routine once while continuing to send the secondary alarm issue command to the meter device 216. In the case where the CPU determines that both conditions are further satisfied, the CPU proceeds to step S308. In step S308, the CPU clears the number of times of issuing the secondary alarm that is counted in step S304 (the CPU adjusts the measurement result of the number of times of issuing to "0"). Then, the CPU ends the getting-off support routine once while continuing to send the secondary alarm issue command to the meter device 216.

In this way, in the case where both conditions are further satisfied while the meter device 216 repeats the issuing of the secondary alarm ("Yes" in step S307), the number of times of issuing the secondary alarm by the meter device 216 is the total value of "the number of times of issuing before the time point when both conditions are further satisfied" and "the prescribed times-number Q". Accordingly, the number of times of issuing the secondary alarm by the meter device 216 is increased.

Getting-Off Support Routine Relevant to Right BSM Indicator and Left BSM Indicator The CPU executes the getting-off support routine shown in FIG. 9, for each of the right BSM indicator 214 and the left BSM indicator 215.

In step S401, the CPU determines whether both conditions are satisfied for at least one door on the corresponding side. In the case where the CPU determines that both conditions are not satisfied for each door on the corresponding side, the CPU proceeds to step S402. In the case where the CPU determines that both conditions are satisfied for at least one door on the corresponding side, the CPU proceeds to step S403.

In the case where the CPU is sending the secondary alarm issue command (blinking command) to the corresponding BSM indicator, the CPU stops sending the secondary alarm issue command in step S402. In the case where the CPU proceeds to step S402 before the number of times of issuing the secondary alarm from the start of the sending of the secondary alarm issue command reaches the prescribed times-number Q, the CPU continues to send the secondary alarm issue command such that the secondary alarm is issued a predetermined number of times after it is determined in step S401 that both conditions are not satisfied, and thereafter stops sending the secondary alarm issue command. Further, in the case where the CPU is not sending the secondary alarm issue command to the corresponding BSM indicator, the CPU maintains the state where the CPU is not sending the secondary alarm issue command. Then, the CPU ends the getting-off support routine once.

In step S403, the CPU sends the secondary alarm issue command to the corresponding BSM indicator. Thereby, the corresponding BSM indicator issues the secondary alarm. In the case where the CPU is sending the secondary alarm issue command to the corresponding BSM indicator, the CPU continues to send the secondary alarm issue command.

Then, the CPU proceeds to step S404. In step S404, the CPU measures the number of times of issuing the secondary alarm by the corresponding BSM indicator. Then, the CPU proceeds to step S405.

In step S405, the CPU determines whether the number of times of issuing the secondary alarm by the corresponding BSM indicator has reached the prescribed times-number Q. In the case where the number of times of issuing the secondary alarm by the corresponding BSM indicator has reached the prescribed times-number Q, the CPU proceeds to step S406. In the case where the number of times of issuing the secondary alarm by the corresponding BSM indicator has not reached the prescribed times-number Q, the CPU proceeds to step S407.

In step S406, the CPU clears the number of times of issuing the secondary alarm that is counted in step S404 (the CPU adjusts the measurement result of the number of times of issuing to "0"). Then, the CPU proceeds to step S402. When the CPU proceeds to step S402, the CPU stops sending the secondary alarm issue command to the corresponding BSM indicator. Thereby, the corresponding BSM indicator stops issuing the secondary alarm. Then, the CPU ends the getting-off support routine once.

In step S407, the CPU determines whether both conditions are further satisfied for the door on the corresponding side. In the case where the CPU does not determine that both conditions are further satisfied for the door on the corresponding side, the CPU ends the getting-off support routine once while continuing to send the secondary alarm issue command to the corresponding BSM indicator. In the case where the CPU determines that both conditions are further satisfied, the CPU proceeds to step S408.

In step S408, the CPU clears the number of times of issuing the secondary alarm that is counted in step S404 (the CPU adjusts the measurement result of the number of times of issuing to "0"). Then, the CPU ends the getting-off support routine once while continuing to send the secondary alarm issue command to the corresponding BSM indicator.

Third Embodiment

Next, a third embodiment will be described. In the third embodiment, in the case where both conditions are satisfied multiple times at different time points, a device that issues the secondary alarm because of the first satisfaction of both conditions (that is, because both conditions are satisfied due to a certain event in the state where both conditions are not satisfied) and a device that issues the secondary alarm because of the second and subsequent satisfactions of both conditions (that is, because both conditions are satisfied due to a different event from the certain event) are different from each other. Similarly to the first embodiment or the second embodiment, when a getting-off support device 20 according to the third embodiment determines that both conditions are satisfied, the getting-off support device 20 causes a predetermined device included in the getting-off support device 20 to issue the secondary alarm. Then, in the case where the getting-off support device 20 determines during the issuing of the secondary alarm that an "additional issuing condition" that is a condition for additionally issuing another secondary alarm is satisfied, the getting-off support device 20 causes a different device from the device that is issuing the secondary alarm at the time point when the additional issuing condition is satisfied to issue the secondary alarm. The same condition as the "prolongation condition" in the first embodiment can be applied as the "additional issuing condition".

For example, in the case where it is newly determined that both conditions are satisfied in the state where both conditions are not satisfied (that is, in the case of the first satisfaction of both conditions), the getting-off support device 20 executes "blinking of the right BSM indicator 214 and/or the left BSM indicator 215", "sounding of the buzzer 218 of the meter device 216", "displaying of a predetermined attention call image by the MID 219 of the meter device 216", and "speaking of a predetermined voice announcement by the speaker of the multimedia device 217 for the side on which both conditions are satisfied", as the secondary alarm. That is, the getting-off support device 20 controls "the right BSM indicator 214 and/or the left BSM indicator 215", "the meter device 216 (the buzzer 218)", "the meter device 216 (the MID 219)" and "the multimedia device 217 (the speaker for the side on which both conditions are satisfied)", as some of the plurality of devices that is included in the getting-off support device 20 and that can issue the alarm, and causes the devices to issue secondary alarms having predetermined contents. In this case, a voice announcement having a content that makes it possible to inform the occupant about the reason why the secondary alarm is issued is applied as the "voice announcement". As such a voice announcement, for example, a voice announcement giving information of "another vehicle is coming close from the rearward side of the vehicle" is applied.

Then, in the case where it is determined that the additional issuing condition is satisfied (that is, in the case of the second and subsequent satisfactions of both conditions), the getting-off support device 20 executes "blinking of the BSM indicator for the side on which both conditions are satisfied", "sounding of the buzzer 218 of the meter device 216" and "displaying of a predetermined attention call image by the MID 219 of the meter device 216", as the secondary alarm. That is, at the time of the second and subsequent satisfactions of both conditions, the getting-off support device 20 does not execute "speaking of a predetermined voice announcement by the speaker of the multimedia device 217 for the side on which both conditions are satisfied", as the secondary alarm. This is because it can be regarded that the occupant has already understood the reason why the secondary alarm is issued from the voice announcement issued as the secondary alarm at the time of the first satisfaction of both conditions. In this way, the getting-off support device 20 controls "the right BSM indicator 214 and/or the left BSM indicator 215", "the meter device 216 (the buzzer 218)" and "the meter device 216 (the MID 219)", as some of the plurality of devices that is included in the getting-off support device 20 and that can issue the alarm, and causes the devices to issue secondary alarms having predetermined contents.

With this configuration, since the device that issues the secondary alarm due to the first satisfaction of both conditions and the device that issues the secondary alarm due to the second satisfaction of both conditions are different from each other, it is possible to make a difference between the content of the secondary alarm that is issued due to the first satisfaction of both conditions and the content of the secondary alarm that is issued due to the satisfaction of the additional issuing condition (the second and subsequent satisfactions of both conditions). Therefore, for example, in the case where a certain occupant opens the right front door 102 for getting off the vehicle 10 from the right front door 102 while the physical body condition is satisfied for the right side of the vehicle 10 and thereafter another occupant opens the right rear door 103 for getting off the vehicle 10 from the right rear door 103 as described in the example (1), it is possible to issue an appropriate alarm (call attention) for each occupant.

As described above, a plurality of devices may be included in each of the device that issues the secondary alarm in the case of the first satisfaction of both conditions and the device that issues the secondary alarm in the case of the satisfaction of the additional issuing condition. In this case, the plurality of devices that issues the secondary alarm in the case of the first satisfaction of both conditions and the plurality of devices that issues the secondary alarm in the case of the satisfaction of the additional issuing condition only need to avoid a complete coincidence, and some identical devices may be included. In the case where an identical device is included in each of the plurality of devices that issues the secondary alarm in the case of the first satisfaction of both conditions and the plurality of devices that issues the secondary alarm in the case of the satisfaction of the additional issuing condition, the identical device prolongs the continuation time of issuing the secondary alarm until the prescribed time P elapses from the second satisfaction of both conditions, or increases the number of times of issuing the secondary alarm until the number of times of issuing the secondary alarm from the second satisfaction of both conditions reaches the prescribed times-number Q.

Fourth Embodiment

Next, a fourth embodiment will be descried. In the fourth embodiment, in the case where both conditions are satisfied multiple times at different time points, the content of the secondary alarm that is issued due to the first satisfaction of both conditions and the content of the secondary alarm that is issued due to the second and subsequent satisfactions of both conditions are different from each other. Similarly to the first embodiment or the second embodiment, when it is determined that both conditions are satisfied, a getting-off support device 20 according to the fourth embodiment causes a predetermined device included in the getting-off support device 20 to issue the secondary alarm. Then, during the issuing of the secondary alarm, the getting-off support device 20 determines whether a "content change condition" that is a condition for issuing another secondary alarm having a different content from the content of the secondary alarm that is being issued is satisfied. In the case where the content change condition is satisfied, the getting-off support device 20 issues a secondary alarm having a different content from the content of the secondary alarm that is being issued at the time point. The same condition as the "prolongation condition" in the first embodiment can be applied as the "content change condition".

Specifically, in the case where the getting-off support device 20 determines that both conditions are newly satisfied in the state where both conditions are not satisfied (that is, in the case of the first satisfaction of both conditions), the getting-off support device 20 executes "blinking of the BSM indicator for the side on which both conditions are satisfied", "sounding of the buzzer 218 of the meter device 216", "displaying of a predetermined attention call image on the MID 219 of the meter device 216" and "speaking of a predetermined voice announcement by the speaker of the multimedia device 217 for the side on which both conditions are satisfied", as the issuing of the secondary alarm.

In the case where the getting-off support device 20 determines that both conditions are further satisfied in the state where both condition are satisfied (that is, in the case of the second satisfaction of both conditions), the getting-off support device 20 determines that the content change condition is satisfied. Then, the getting-off support device 20 executes "blinking of the BSM indicator for the side on which both conditions are satisfied", "sounding of the buzzer 218 of the meter device 216", "displaying of a predetermined attention call image on the MID 219 of the meter device 216" and "speaking of a predetermined voice announcement by the speakers of the multimedia device 217 for both sides", as the secondary alarm. With this configuration, it is possible to inform the occupant that the issuing of the secondary alarm due to the second satisfaction of both conditions is different from the issuing of the secondary alarm due to the first satisfaction of both conditions. That is, it is possible to exert the same effect as the effect in the third embodiment.

As another example, "displaying of a predetermined attention call image on the MID 219 of the meter device 216" or "displaying of a predetermined attention call image on the display 224 of the multimedia device 217" may be included in the secondary alarms that are issued due to the first satisfaction of both conditions and the second and subsequent satisfactions of both conditions. In this case, the getting-off support device 20 can change the content of the attention call image for each satisfaction of both conditions.

Furthermore, as another example, "speaking of a predetermined voice announcement by the speaker of the multimedia device 217 for the side on which both conditions are satisfied" may be included in the secondary alarms that are issued due to the first satisfaction of both conditions and the second and subsequent satisfactions of both conditions. In this case, the getting-off support device 20 can change the content and/or tone of the voice announcement for each satisfaction of both conditions.

Fifth Embodiment

Next, a fifth embodiment will be described. In the fifth embodiment, in the case where both conditions are satisfied multiple times at different time points, the device that issues the secondary alarm due to the first satisfaction of both conditions and the content of the secondary alarm are different from the device that issues the secondary alarm due to the second and subsequent satisfactions of both conditions and the content of the secondary alarm. Similarly to the first embodiment or the second embodiment, when it is determined that both conditions are satisfied, a getting-off support device 20 according to the fifth embodiment controls a predetermined device included in the getting-off support device 20, and thereby causes the predetermined device to issue the secondary alarm. The "predetermined device" is constituted by some or all of the plurality of device that is included in the getting-off support device 20 and that can issue the alarm. The same condition as the "prolongation condition" in the first embodiment is applied as the "additional issuing condition".

For example, in the case where the getting-off support device 20 determines that both conditions are newly satisfied in the state where both conditions are not satisfied (that is, in the case of the first satisfaction of both conditions), the getting-off support device 20 executes "blinking of the BSM indicator for the side on which both conditions are satisfied", "sounding of the buzzer 218 of the meter device 216", "displaying of a predetermined attention call image on the MID 219 of the meter device 216" and "speaking of a predetermined voice announcement by the speaker of the multimedia device 217 for the side on which both conditions are satisfied", as the secondary alarm. That is, the getting-off support device 20 controls "the BSM indicator for the side on which both conditions are satisfied", "the buzzer 218 of the meter device 216", "the MID 219 of the meter device 216" and "the speaker of the multimedia device 217 for the side on which both conditions are satisfied", as some of the plurality of devices that is included in the getting-off support device 20 and that can issue the alarm, and causes the devices to issue the secondary alarm. In this case, a voice announcement having a content that makes it possible to inform the occupant about the reason why the secondary alarm is issued is applied as the "voice announcement". As such a voice announcement, for example, a voice announcement giving information of "another vehicle is coming close from the rearward side of the vehicle" is applied.

Then, in the case where the getting-off support device 20 determines that both conditions are further satisfied in the state where both conditions are satisfied (that is, in the case of the second and subsequent satisfactions of both conditions), the getting-off support device 20 determines that the additional issuing condition is satisfied, and executes "blinking of the BSM indicator for the side on which both conditions are satisfied", "sounding of the buzzer 218 of the meter device 216", "displaying of a predetermined attention call image on the MID 219 of the meter device 216" and "making of the beep sound (warning sound) by the speaker of the multimedia device 217 for the side on which both conditions are satisfied", as the secondary alarm. That is, the speaker of the multimedia device 217 issues the warning sound, instead of the voice announcement, as the secondary alarm due to the second and subsequent satisfactions of both conditions. That is, the getting-off support device 20 controls "the BSM indicator for the side on which both conditions are satisfied", "the buzzer 218 of the meter device 216", "the MID 219 of the meter device 216" and "the speaker of the multimedia device 217 for the side on which both conditions are satisfied", as some of the plurality of devices that is included in the getting-off support device 20 and that can issue the alarm, and causes the devices to issue the secondary alarm. The content of the secondary alarm that is issued by "the speaker of the multimedia device 217 for the side on which both conditions are satisfied" is different from the content of the secondary alarm in the case of the first satisfaction of both conditions.

Sixth Embodiment

Next, a sixth embodiment will be described. Constituents in common with those in the first embodiment are denoted by the same reference numerals as those in the first embodiment, and descriptions are omitted. Further, the same condition as the physical body condition in the first embodiment can be applied as the physical body condition in the sixth embodiment.

Configuration of Getting-Off Support Device

Figure 10:
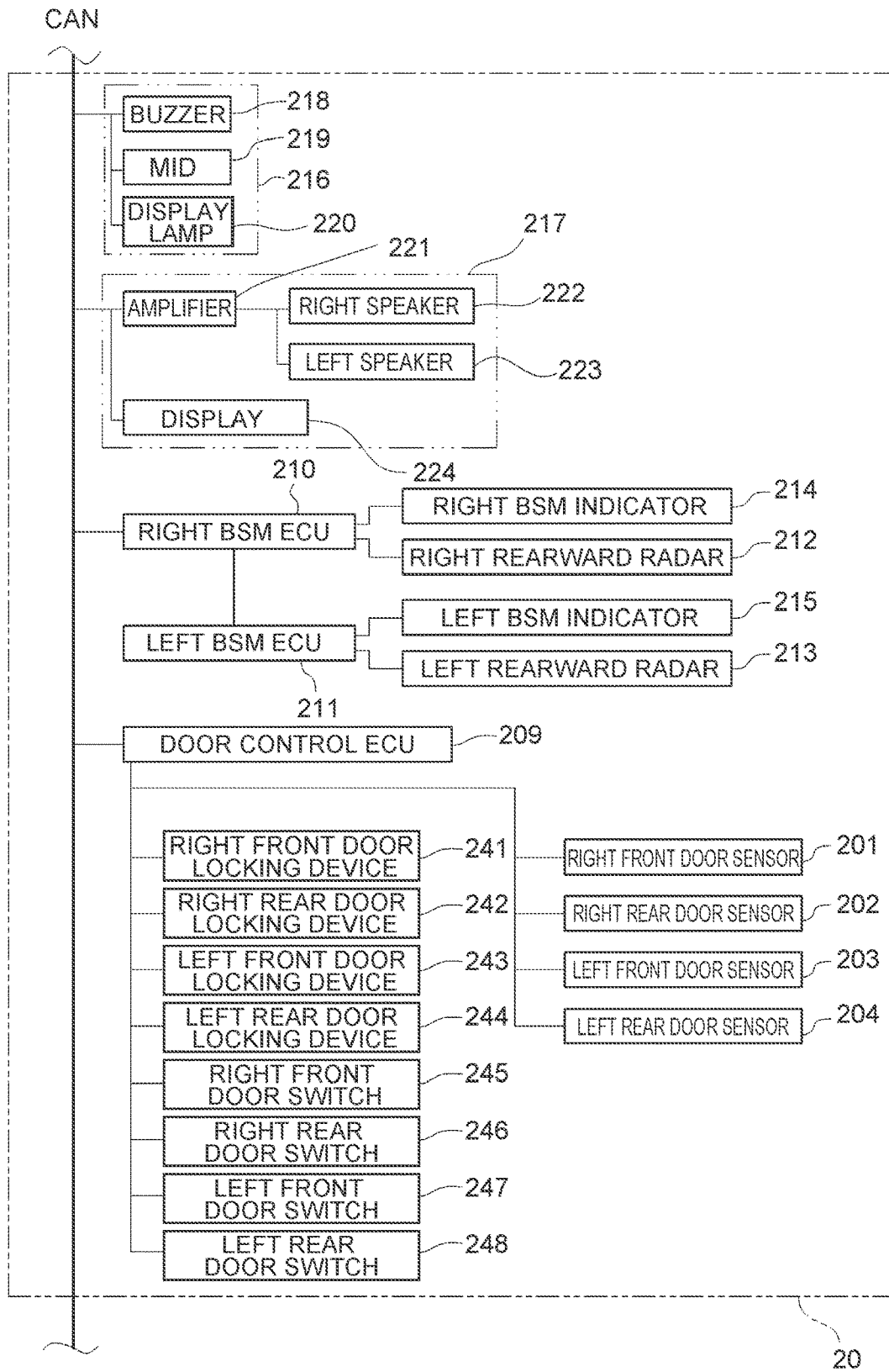
FIG. 10 is a diagram showing a configuration of a getting-off support device.

FIG. 10 is a diagram showing a configuration of a getting-off support device 20 according to the sixth embodiment. As shown in FIG. 10, similarly to the getting-off support device 20 according to the first embodiment, the getting-off support device 20 according to the sixth embodiment includes the right front door sensor 201, the right rear door sensor 202, the left front door sensor 203, the left rear door sensor 204, the door control ECU 209, the right BSM ECU 210, the left BSM ECU 211, the right rearward radar 212, the left rearward radar 213, the right BSM indicator 214, the left BSM indicator 215, the meter device 216 and the multimedia device 217. Furthermore, the getting-off support device 20 according to the sixth embodiment includes a right front door locking device 241, a right rear door locking device 242, a left front door locking device 243, a left rear door locking device 244, a right front door switch 245, a right rear door switch 246, a left front door switch 247 and a left rear door switch 248.

Each of the right front door locking device 241, the right rear door locking device 242, the left front door locking device 243 and the left rear door locking device 244 is configured to switch between a state (latching state) of holding the corresponding door of the doors 102, 103, 104, 105 in the close state by drive force of an actuator and a state (unlatching state) of permitting the open state of the corresponding door of the doors 102, 103, 104, 105. Each of the right front door switch 245, the right rear door switch 246, the left front door switch 247 and the left rear door switch 248 is a switch that can be operated by the occupant, and when the door switch is operated, the door control ECU 209 sends a predetermined command (a command to execute an action of switching from the latching state to the unlatching state) to the corresponding door locking device. Each door locking device receives the predetermined command from the door control ECU 209, and switches from the latching state to the unlatching state. The configurations of each door locking device and each door switch are not particularly limited, and various known configurations can be applied.

Getting-Off Support Control

Next, a getting-off support control that is executed by the getting-off support device 20 will be described. In the case where the physical body condition is satisfied for one of the doors 102, 103, 104, 105 and where the getting-off support device 20 according to the sixth embodiment detects an operation to the door switch corresponding to the door for which the physical condition is satisfied, the getting-off support device 20 according to the sixth embodiment determines that a reject condition that is a condition for "the door locking device does not switch from latching state to the unlatching state" is satisfied. In the case where the reject condition is satisfied, the getting-off support device 20 prohibits the door control ECU 209 from sending the predetermined command to the door locking device (that is, the getting-off support device 20 avoids the door locking device from switching to the latching state), and issues a sound (this sound is referred to as a "reject sound" hereinafter) for informing the occupant that the switching to the latching state has not been executed. In the embodiment, a sound "Pi, Pi", more specifically, a sound resulting from repeating a sound "Pi" two times is applied as the reject sound.

In some cases, while the reject sound is issued because the reject condition is satisfied, the reject condition is further satisfied. For example, an example (2) and example (3) described below are assumed.

Example (2): While the physical body condition is satisfied for the right side of the vehicle 10, an occupant operates the right front door switch 245 for getting off the vehicle 10 from the right front door 102, and thereafter another occupant operates the right rear door switch 246 for getting off the vehicle 10 from the right rear door 103. In this case, the right BSM ECU 210 first determines that the reject condition is satisfied by the operation to the right front door switch 245, and thereafter determines that the reject condition is further satisfied by the operation to the right rear door switch 246.

Example (3): While the physical body condition is satisfied for the right side of the vehicle 10, an occupant operates the right front door switch 245 for getting off the vehicle 10 from the right front door 102, but the right front door locking device 214 does not switch to the latching state, so that the occupant further operates the right front door switch 245. In this case, the right BSM ECU 210 first determines that the reject condition is satisfied by the first operation to the right front door switch 245, and thereafter determines that the reject condition is further satisfied by the second operation to the right front door switch 245.

In the case of the example (2), when the right BSM ECU 210 determines that the reject condition is satisfied at the first time (that is, in a state where the reject sound is not issued), the right BSM ECU 210 sends a reject sound issue command to the meter device 216. Then, the meter device 216 issues the reject sound. However, in the case where the determination of the second satisfaction of the reject condition is made and thereby the reject sound issue command is further sent to the meter device 216 before the meter device 216 finishes issuing the reject sound, the meter device 216 issues the reject sound in response to the second reject issue command. In this case, the reject sound for the right front door 102 and the reject sound for the right rear door 103 are overlapped. Therefore, in the case where the reject sound is a sound resulting from repeating the sound "Pi" two times as described above, a sound "Pi, Pi, Pi" resulting from repeating the sound "Pi" three times or a sound "Pi, Pi, Pi, Pi" resulting from repeating the sound "Pi" four times can be generated depending on the timing of the overlap of the reject sound for the right front door 102 and the reject sound for the right rear door 103. As a result, the occupant hears a different sound from the original reject sound, and therefore is likely not to recognize "The reject sound is repeated multiple times". The same goes for the example (3).

Hence, in the case where the reject sound is issued because it is determined that the reject condition is satisfied due to a first event (an event occurs at a time point when the reject sound is not issued) and where it is determined during the issuing of the reject sound that the reject condition is satisfied due to a second event that is different from the first event, the getting-off support device 20 according to the embodiment does not issue the reject sound corresponding to the second event. In the example (2), "the operation to the right front door switch 245 during the satisfaction of the physical body condition for the right side" corresponds to the first event, and "the operation to the right rear door switch 246 during the satisfaction of the physical body condition for the right side" corresponds to the second event. Further, in the example (3), "the first operation to the right front door switch 245 during the satisfaction of the physical body condition for the right side" corresponds to the first event, and "the second operation to the right front door switch 245 during the satisfaction of the physical body condition for the right side" corresponds to the second event.

By this control, it is possible to avoid the overlap of reject sounds. That is, as described above, the reject sound is a previously determined sound, and therefore, when the occupant hears a different sound from the previously determined sound as a result of the overlap of reject sounds, there is fear that the occupant does not recognize "the reject sounds overlapped with each other" as the sound indicating "the action of switching from the latching state to the unlatching state has not been executed". Furthermore, there is fear that the occupant recognizes "the reject sounds overlapped with each other" as a sound having a different meaning from the sound indicating "the action of switching from the latching state to the unlatching state has not been executed". Hence, the getting-off support device 20 according to the sixth embodiment avoids the overlap of reject sounds, and thereby prevents the occupant from falsely recognizing the meaning of the reject sound.

In the case where the getting-off support device 20 according to the sixth embodiment determines that the reject condition is satisfied multiple times at different time points, the getting-off support device 20 does not issue the reject sound due to the second and subsequent determinations of the satisfaction of the physical body condition and the operation condition, instead of changing the time point of issuing the reject sound for avoiding the overlap of the reject sounds. That is, the reject sound is a sound for informing the occupant about "the action corresponding to the operation to the door switch has not been executed", and therefore, when the time point of issuing the reject sound is delayed from the time point of the operation to the door switch, there is fear that the occupant cannot understand the meaning of the reject sound (the operation corresponding to the action that has not been executed). Further, in the case where the occupant repeatedly operates the door switch multiple times, the reject sound is repeatedly issued despite the stop of the operation, and there is fear that the occupant has an uncomfortable feeling for the reject sound. In contrast, in the embodiment, only the reject sound corresponding to the first operation (the operation at the time point when the reject sound is not issued) is issued, and therefore it is possible to prevent the above situations.

Specific Behavior

Next, a specific behavior of the right BSM ECU 210 will be described. FIG. 11 is a flowchart showing a getting-off support routine that is executed by the CPU of the right BSM ECU 210. The CPU of the right BSM ECU 210 repeatedly executes the getting-off support routine shown in FIG. 11, with a predetermined period.

In step S501, the CPU determines whether the door switches have been operated. In the case where the CPU determines that each door switch has not been operated, the CPU ends the getting-off support routine once. In the case where the CPU determines that at least one door switch has been operated, the CPU proceeds to step S502.

In step S502, the CPU determines whether the physical body condition is satisfied for the door corresponding to the operated door switch. In the case where the CPU determines that the physical body condition is not satisfied, the CPU proceeds to step S503.

In step S503, the CPU does not prohibit the door control ECU 209 from sending the predetermined command to the door locking device. Therefore, the door control ECU 209 sends the predetermined command to the door locking device corresponding to the operated door switch. Thereby, the corresponding door locking device switches to the unlatching state.

In the case where the CPU determines in step S502 that the physical body condition is satisfied, the CPU proceeds to step S504. In step S504, the CPU determines whether the reject sound is currently being made. In the case where the CPU determines that the reject sound is not being made, the CPU proceeds to step S505, and in the case where the CPU determines that the reject sound is being made, the CPU proceeds to step S506. In step S505, the CPU prohibits the door control ECU 209 from sending the predetermined command to the door locking device corresponding to the operated door switch. Furthermore, the CPU sends the reject sound issue command to the meter device 216. Therefore, the door locking device corresponding to the operated door switch does not switch to the unlatching state, and the predetermined reject sound is made. In this way, in the case where the door switch is operated while the reject sound is not issued and where the physical body condition is satisfied for the corresponding door, the reject sound is issued. On the other hand, in step S506, the CPU prohibits the door control ECU 209 from sending the predetermined command to the door locking device. Furthermore, the CPU does not send the reject sound issue command to the meter device 216. Therefore, the door locking device corresponding to the operated door switch does not switch to the unlatching state, and the predetermined reject sound is not made.

By this getting-off support routine, it is possible to prevent the overlap of reject sounds and the repeat of reject sounds.

In the embodiment, the process in which the reject sound is not further made in the case where the reject sound is being issued has been shown, but for example, a process in which the reject sound is not issued until a predetermined time elapses after the finish of issuing the reject sound may be adopted. By this process also, the repeat of reject sounds is prevented. Further, in the embodiment, the example in which the sound resulting from repeating the sound "Pi" two times is applied as the reject sound has been shown, but the reject sound is not limited to this sound.

The getting-off support devices according to the embodiments of the present disclosure have been described above. The present disclosure is not limited to the above embodiments, and various modifications can be made without departing from the object of the present disclosure.

For example, in the embodiments, the right BSM ECU 210 executes the getting-off support routine, but a device other than the right BSM ECU 210 may execute the getting-off support routine. More specifically, the left BSM ECU 211 may execute the getting-off support routine. Further, the door control ECU 209 may execute the getting-off support routine. In addition, the getting-off support device 20 may include a different ECU other than the right BSM ECU 210, the left BSM ECU 211 and the door control ECU 209, and the different ECU may execute the getting-off support routine. Furthermore, a plurality of devices may execute the getting-off support routine in cooperation. In this way, the device that executes the getting-off support routine is not limited.

Further, the contents and determination methods for the physical body condition and the getting-off condition are not limited to the contents and determination methods shown in the embodiments.

What is claimed is:

1. A getting-off support device comprising:
   an alarm issuing unit provided in a vehicle having a plurality of doors including a first door and a second door and configured to issue an alarm; and
   an alarm issuing control unit including one or more processors provided in the vehicle and configured to:
   determine whether a physical body condition is satisfied, the physical body condition indicating that a physical body that obstructs getting-off of an occupant in the vehicle exists around the vehicle;
   determine whether a first getting-off condition is satisfied, based on an open-close state of the first door, the first getting-off condition indicating that the occupant in the vehicle intends to get off the vehicle from the first door;
   control, when both of the physical body condition and the first getting-off condition are satisfied, the alarm issuing unit such that the alarm issuing unit issues the alarm for a predetermined time;
   determine whether a second getting-off condition is satisfied, based on an open-close state of the second door, the second getting-off condition indicating that the occupant in the vehicle intends to get off the vehicle from the second door; and control, when both of the physical body condition and the second getting-off condition are further satisfied while the alarm issuing unit issues the alarm, the alarm issuing unit such that a time during which the alarm issuing unit issues the alarm is prolonged relative to the predetermined time.

2. The getting-off support device according to claim 1, wherein:

when both of the physical body condition and the first getting-off condition are satisfied, the one or more processors are configured to control the alarm issuing unit; such that the alarm issuing unit issues the alarm for a prescribed time that is a previously prescribed time; and when both of the physical body condition and the second getting-off condition are further satisfied while the alarm issuing unit issues the alarm, the one or more processors are configured to controls the alarm issuing unit; such that the alarm issuing unit continues to issue the alarm until the prescribed time elapses after both of the physical body condition and the second getting-off condition are further satisfied.

3. A getting-off support device comprising:

an alarm issuing unit provided in a vehicle having a plurality of doors including a first door and a second door and configured to issue an alarm; and an alarm issuing control unit including one or more processors provided in the vehicle and configured to:

determine whether a physical body condition is satisfied, the physical body condition indicating that a physical body that obstructs getting-off of an occupant in the vehicle exists around the vehicle;

determine whether a first getting-off condition is satisfied, based on an open-close state of the first door, the first getting-off condition indicating that the occupant in the vehicle intends to get off the vehicle from the first door;

control, when both of the physical body condition and the first getting-off condition are satisfied, the alarm issuing unit; such that the alarm issuing unit repeatedly issues the alarm a predetermined number of times;

determine whether a second getting-off condition is satisfied, based on an open-close state of the second door, the second getting-off condition indicating that the occupant in the vehicle intends to get off the vehicle from the second door; and control, when both of the physical body condition and the second getting-off condition are further satisfied while the alarm issuing unit issues the alarm, the alarm issuing unit; such that the number of times of issuing the alarm by the alarm issuing unit is increased.

4. The getting-off support device according to claim 3, wherein:

when both of the physical body condition and the first getting-off condition are satisfied, the one or more processors are configured to controls the alarm issuing unit such that the alarm issuing unit repeatedly issues the alarm a prescribed number of times that is a previously prescribed number of times; and when both of the physical body condition and the second getting-off condition are further satisfied while the alarm issuing unit issues the alarm, the one or more processors are configured to controls the alarm issuing unit; such that the alarm issuing unit repeatedly issues the alarm the prescribed number of times after both of the physical body condition and the second getting-off condition are further satisfied.

5. A getting-off support device comprising:

an alarm issuing unit provided in a vehicle having a plurality of doors including a first door and a second door and configured to issue an alarm in a plurality of different manners; and an alarm issuing control unit including one or more processors provided in the vehicle and configured to:

determine whether a physical body condition is satisfied, the physical body condition indicating that a physical body that obstructs getting-off of an occupant in the vehicle exists around the vehicle;

determine whether a first getting-off condition is satisfied, based on an open-close state of the first door, the first getting-off condition indicating that the occupant in the vehicle intends to get off the vehicle from the first door;

control, when both of the physical body condition and the first getting-off condition are satisfied, the alarm issuing unit such that the alarm issuing unit issues the alarm in a predetermined manner;

determine whether a second getting-off condition is satisfied, based on an open-close state of the second door, the second getting-off condition indicating that the occupant in the vehicle intends to get off the vehicle from the second door; and control, when both of the physical body condition and the second getting-off condition are further satisfied while the alarm issuing unit issues the alarm in the predetermined manner, the alarm issuing unit such that the alarm issuing unit issues the alarm in a different manner from the predetermined manner.

6. The getting-off support device according to claim 5, wherein:

the alarm that is issued in a case where the physical body condition and the first getting-off condition are satisfied for a right side of the vehicle and the alarm that is issued in a case where the physical body condition and the second getting-off condition are satisfied for a left side of the vehicle are different in content from each other.

7. The getting-off support device according to claim 5, wherein:

the alarm that is issued in a case where the physical body condition and the first getting-off condition are satisfied for a left side of the vehicle and the alarm that is issued in a case where the physical body condition and the second getting-off condition are satisfied for a right side of the vehicle are different in content from each other.

8. A getting-off support device comprising:

a plurality of alarm issuing units provided in a vehicle having a plurality of doors including a first door and a second door and configured to issue an alarm in a plurality of different manners; and an alarm issuing control unit including one or more processors provided in the vehicle and configured to:

determine whether a physical body condition is satisfied, the physical body condition indicating that a physical body that obstructs getting-off of an occupant in the vehicle exists around the vehicle;

determine whether a first getting-off condition is satisfied, based on an open-close state of the first door, the first getting-off condition indicating that the occupant in the vehicle intends to get off the vehicle from the first door;

control, when both of the physical body condition and the first getting-off condition are satisfied, at least one of the plurality of alarm issuing units; such that the at least one of the plurality of alarm issuing units issues the alarm;

determine whether a second getting-off condition is satisfied, based on an open-close state of the second door, the second getting-off condition indicating that the occupant in the vehicle intends to get off the vehicle from the second door; and control, when both of the physical body condition and the second getting-off condition are further satisfied while the at least one of the plurality of alarm issuing units issues the alarm, at least another one of the plurality of alarm issuing units; such that the at least another one of the plurality of alarm issuing units issues the alarm.

9. A getting-off support device comprising:

a door locking device configured to be capable of switching a door provided on a vehicle from an unopenable state to an openable state by drive force of a drive force source;

an operation unit configured to be operated by an occupant such that the door locking device switches the door from the unopenable state to the openable state;

a sound issuing unit configured to be capable of issuing a predetermined sound; and a control unit configured to control the door locking device such that the door locking device switches the door from the unopenable state to the openable state, and to control the issuing of the predetermined sound by the sound issuing unit, wherein:

the control unit determines whether a physical body condition is satisfied, the physical body condition indicating that a physical body that obstructs getting-off of the occupant in the vehicle exists around the vehicle;

when the operation unit is operated in a case where the physical body condition is satisfied and where the sound issuing unit does not issue the predetermined sound, the control unit controls the door locking device such that the door locking device does not switch the door from the unopenable state to the openable state, and controls the sound issuing unit such that the sound issuing unit issues the predetermined sound indicating that the door has not been switched to the openable state by the operation to the operation unit; and when the operation unit is operated in a case where the physical body condition is satisfied and where the sound issuing unit issues the predetermined sound, the control unit controls the door locking device such that the door locking device does not switch the door from the unopenable state to the openable state, and controls the sound issuing unit such that the sound issuing unit does not issue the predetermined sound by the operation to the operation unit during the issuing of the predetermined sound by the sound issuing unit.

\* \* \* \* \*